US012444032B1

(12) United States Patent
Riddle et al.

(10) Patent No.: US 12,444,032 B1
(45) Date of Patent: Oct. 14, 2025

(54) SYSTEMS, METHODS, APPARATUSES, AND DEVICES FOR FACILITATING EDITING OF IMAGES USING IMAGE EDITING TOOLS

(71) Applicant: Color Grading LLC, West Jordan, UT (US)

(72) Inventors: Denver Kent Riddle, Tamworth, NH (US); Bartłomiej Walczak, Wiązowna (PL)

(73) Assignee: Color Grading LLC, West Jordan, UT (US)

( * ) Notice: Subject to any disclaimer, the term of this patent is extended or adjusted under 35 U.S.C. 154(b) by 0 days.

(21) Appl. No.: 19/265,023

(22) Filed: Jul. 10, 2025

Related U.S. Application Data

(63) Continuation-in-part of application No. 18/939,457, filed on Nov. 6, 2024, now Pat. No. 12,394,128.

(51) Int. Cl.
  *G06T 5/90* (2024.01)
  *G06F 3/04845* (2022.01)
  *G06F 3/04847* (2022.01)

(52) U.S. Cl.
  CPC ............ *G06T 5/90* (2024.01); *G06F 3/04845* (2013.01); *G06F 3/04847* (2013.01)

(58) Field of Classification Search
  CPC ................................ G06T 5/90; G06F 3/0484
  USPC ........................................................ 382/274
  See application file for complete search history.

(56) References Cited

U.S. PATENT DOCUMENTS

| 12,112,024 B2* | 10/2024 | Manzari | H04N 23/631 |
| 2014/0095551 A1* | 4/2014 | Grosz | G06F 3/0482 |
| | | | 707/812 |
| 2014/0096016 A1* | 4/2014 | Grosz | H04N 1/0019 |
| | | | 715/738 |
| 2014/0096019 A1* | 4/2014 | Gowen | H04N 1/00196 |
| | | | 715/738 |
| 2014/0195921 A1* | 7/2014 | Grosz | G06Q 30/0631 |
| | | | 715/738 |
| 2015/0109323 A1* | 4/2015 | Johnson | G06F 3/0488 |
| | | | 345/594 |

* cited by examiner

*Primary Examiner* — William D Titcomb
(74) *Attorney, Agent, or Firm* — Dhiraj Jindal; PATENT YOGI LLC

(57) ABSTRACT

A non-transitory computer-readable medium storing instructions which, when executed by a processing device of a computing device, causes the computing device to perform a method for facilitating editing of images using image editing tools. Further, the method may include displaying of at least one image, obtaining at least one information, identifying two or more areas of the image, determining a tonal range for each of the two or more areas, determining a value for an attribute associated with each of two or more image elements of the image, generating a graphical representation of the image, displaying at least one adjustment tool, obtaining a selection of a setting from a plurality of settings associated with the at least one adjustment tool, performing at least one operation on the at least one image based on the selection, generating at least one edited image, and displaying the at least one edited image.

20 Claims, 23 Drawing Sheets

SYSTEMS, METHODS, APPARATUSES, AND DEVICES FOR FACILITATING EDITING OF IMAGES USING IMAGE EDITING TOOLS

REFERENCE TO RELATED APPLICATIONS

This application is a continuation in part of U.S. patent application Ser. No. 18/939,457, titled "SYSTEMS, METHODS, APPARATUSES, AND DEVICES FOR FACILITATING EDITING OF IMAGES", filed Nov. 6, 2024, which is incorporated by reference herein in its entirety.

FIELD OF DISCLOSURE

Generally, the present disclosure relates to the field of data processing. More specifically, the present disclosure relates to systems, methods, apparatuses, and devices for facilitating editing of images using image editing tools.

BACKGROUND

Existing techniques for color grading used in video and photo editing software are complex and inefficient. Existing technologies require users to have an in-depth understanding of tonal ranges or pixel brightness (shadows, midtones, highlights) and color correction techniques. Users must interact with virtual interfaces modeled after physical hardware (like trackballs or color wheels) that are separate from the image, causing them to shift focus away from the content they are editing. This disrupts the creative flow, makes the process daunting for beginners, and slows down experts due to additional steps involved.

Further, the existing techniques may include on-image HSL adjustments. The HSL adjustment may refer to adjustments made to the hue, saturation, and lightness (HSL) of an image and/or a video. Further, the on-image HSL adjustments provided by programs allow limited on-image adjustments affecting Hue, Saturation, and Luminance. Further, the on-image HSL adjustments allow users to click on the image to adjust specific colors. Further, the on-image HSL adjustments have drawbacks as they do not address tonal ranges, lack integration with other tools, and are limited in precision and scope.

Existing techniques are deficient with regard to several aspects. For instance, current technologies are complex and have a steep learning curve, as they require advanced knowledge of color theory and tonal ranges. Furthermore, current technologies cause disruption of creative flow as they necessitate shifting focus between the image and separate controls. Moreover, current technologies are inefficient as they have additional steps that slow down the workflow for experts and create barriers for beginners. Further, current technologies provide indirect interaction as the adjustments are made away from the image, reducing intuitiveness and precision. Furthermore, current technologies have limited accessibility as they have intimidating interfaces that deter non-expert users from utilizing advanced color grading techniques.

Further, video scopes have become an indispensable tool in various fields of content creation, including video editing, film production, and digital design. Over time, these tools have evolved from simple devices used for basic monitoring to sophisticated instruments capable of advanced post-production tasks. As the demand for high-quality visual content continues to rise, so does the need for more intuitive and efficient tools that can handle complex adjustments with precision.

One of the most critical aspects of video editing is color correction, which plays a pivotal role in achieving the desired aesthetic for a scene. Traditionally, users have relied on manual adjustments or extensive navigation through menus to achieve specific color settings. However, this process can be time-consuming and inefficient, particularly when dealing with large scenes or requiring precise, localized changes.

Moreover, current systems often lack the ability to provide immediate, real-time feedback during adjustments, which can hinder productivity. Additionally, existing tools may not offer the level of integration required to handle advanced features such as scene analysis automation or context-aware corrections. Further, while some video scopes have incorporated rudimentary user interfaces, they often fall short in providing a seamless and responsive experience. Users frequently find themselves navigating through multiple layers of menus, which can be disorienting and slow down their workflow.

In light of these challenges, there remains a pressing need for improved systems that can address the limitations of existing tools. Therefore, there is a need for improved systems, methods, apparatuses, and devices for facilitating editing of images using image editing tools.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a non-transitory computer-readable medium storing one or more instructions which, when executed by a processing device of a computing device, causes the computing device to perform a method for facilitating editing of images using image editing tools. Further, the method may include displaying one or more images. Further, the method may include obtaining one or more information of the one or more images. Further, the method may include analyzing the one or more information. Further, the method may include identifying two or more areas of the one or more images based on the analyzing of the one or more information. Further, the method may include determining a tonal range from two or more tonal ranges for each of the two or more areas based on the analyzing of the one or more information, and the identifying of the two or more areas. Further, the method may include determining a value for one or more attributes associated with each of two or more image elements of the one or more images based on the analyzing of the one or more information. Further, the one or more images may be comprised of the two or more image elements. Further, the method may include generating one or more graphical representations of the one or more images based on the value for each of the one or more attributes associated with each of the two or more image elements of the one or more images. Further, the method may include displaying one or more adjustment tools. Further, one or more of the one or more adjustment tools include one or more display areas. Further, the one or more graphical representations may be displayed in the one or more display areas. Further, the method may include obtaining a selection of a setting from two or more settings associated with the one or more adjustment tools. Further, the method may include performing one or more operations on the one or more images based on the selection of the setting. Further, the method may include generating one or more edited images based on the performing of the one or more operations. Further, the method may include displaying the one or more edited images.

The present disclosure provides a method for facilitating editing of images using image editing tools. Further, the method may include displaying, using a display device of a computing device, one or more images. Further, the method may include obtaining, using a processing device of the computing device, one or more information of the one or more images. Further, the method may include analyzing, using the processing device of the computing device, the one or more information. Further, the method may include identifying, using the processing device of the computing device, two or more areas of the one or more images based on the analyzing of the one or more information. Further, the method may include determining, using the processing device of the computing device, a tonal range from two or more tonal ranges for each of the two or more areas based on the analyzing of the one or more information, and the identifying of the two or more areas. Further, the method may include determining, using the processing device of the computing device, a value for one or more attributes associated with each of two or more image elements of the one or more images based on the analyzing of the one or more information. Further, the one or more images may be comprised of the two or more image elements. Further, the method may include generating, using the processing device of the computing device, one or more graphical representations of the one or more images based on the value for each of the one or more attributes associated with each of the two or more image elements of the one or more images. Further, the method may include displaying, using the display device of the computing device, one or more adjustment tools. Further, one or more of the one or more adjustment tools include one or more display areas. Further, the one or more graphical representations may be displayed in the one or more display areas. Further, the method may include obtaining, using the processing device of the computing device, a selection of a setting from two or more settings associated with the one or more adjustment tools. Further, the method may include performing, using the processing device of the computing device, one or more operations on the one or more images based on the selection of the setting. Further, the method may include generating, using the processing device of the computing device, one or more edited images based on the performing of the one or more operations. Further, the method may include displaying, using the display device of the computing device, the one or more edited images.

The present disclosure provides a system for facilitating editing of images using image editing tools. Further, the system may include a display device. Further, the display device may be configured for displaying one or more images. Further, the display device may be configured for displaying one or more adjustment tools. Further, one or more of the one or more adjustment tools include one or more display areas. Further, one or more graphical representations may be displayed in the one or more display areas. Further, the display device may be configured for displaying one or more edited images. Further, the system may include a processing device communicatively coupled with the display device. Further, the processing device may be configured for obtaining one or more information of the one or more images. Further, the processing device may be configured for analyzing the one or more information.

Further, the processing device may be configured for identifying two or more areas of the one or more images based on the analyzing of the one or more information. Further, the processing device may be configured for determining a tonal range from two or more tonal ranges for each of the two or more areas based on the analyzing of the one or more information, and the identifying of the two or more areas. Further, the processing device may be configured for determining a value for one or more attributes associated with each of two or more image elements of the one or more images based on the analyzing of the one or more information. Further, the one or more images may be comprised of the two or more image elements. Further, the processing device may be configured for generating the one or more graphical representations of the one or more images based on the value for each of the one or more attributes associated with each of the two or more image elements of the one or more images. Further, the processing device may be configured for obtaining a selection of a setting from two or more settings associated with the one or more adjustment tools. Further, the processing device may be configured for performing one or more operations on the one or more images based on the selection of the setting. Further, the processing device may be configured for generating the one or more edited images based on the performing of the one or more operations.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF DISCLOSURE

Figure 1:
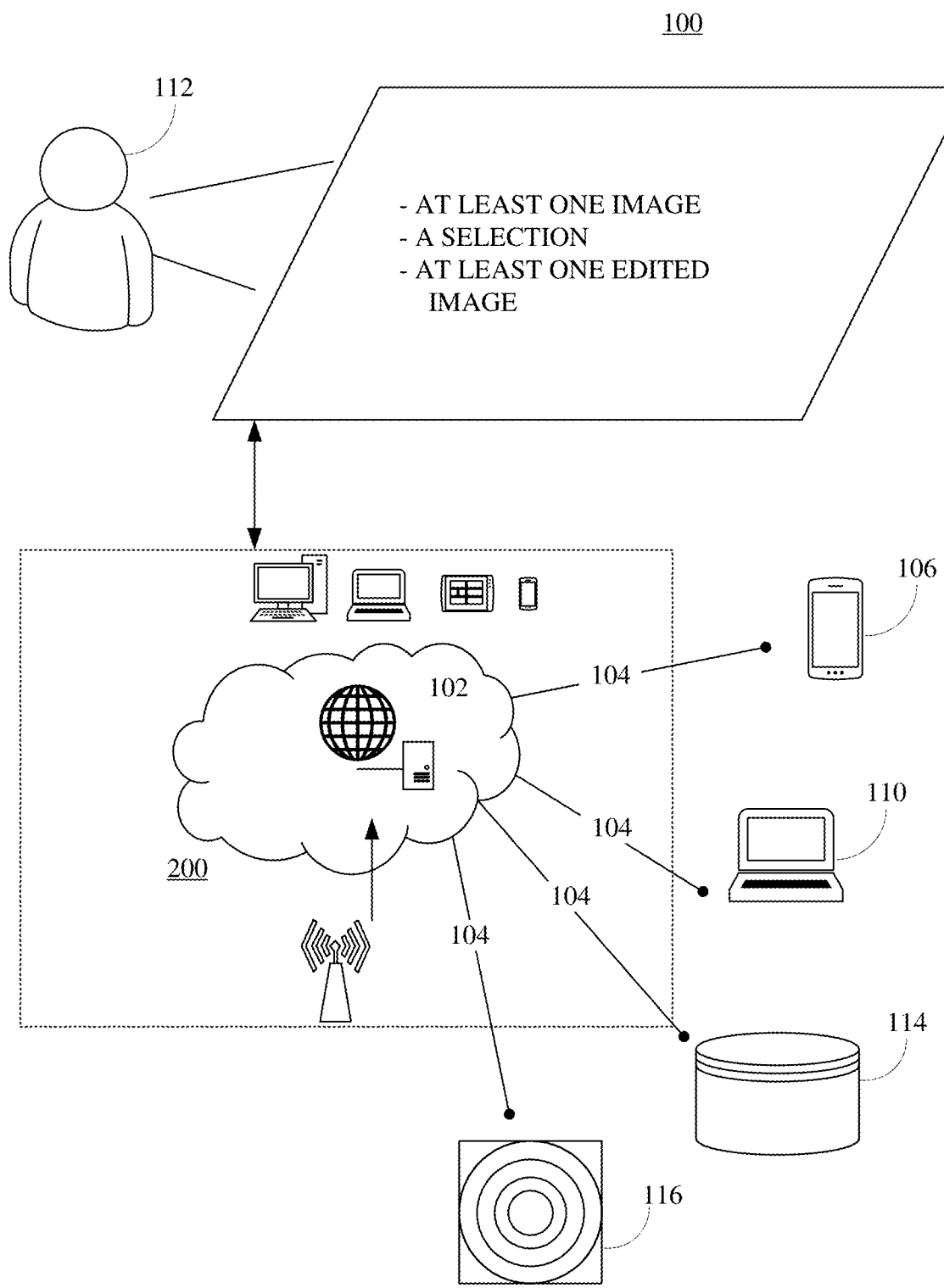
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes systems, methods, apparatuses, and devices for facilitating editing of images using image editing tools. Further, the editing comprises color grading, color correcting, etc. Further, the image editing tools may include video scopes (i.e., waveform scope, vector scope, histogram, RGB parade, etc.)

Further, the present disclosure describes systems, methods, apparatuses, and devices for facilitating editing of images.

Further, the present disclosure describes a direct on-image color grading system with automatic tonal range detection and on-screen color wheels integrated with red, green, and blue (RGB) curves. Further, the direct on-image color grading system may include a direct on-image color grading and image manipulation system. Further, the direct on-image color grading system is a color grading system for photo and video editing software that allows users to make color adjustments directly on the image. Further, the color grading system is a color grading and image manipulation system. When a user clicks on a specific area, the system automatically detects the tonal range (or pixel brightness) of that area-such as shadows, midtones, or highlights. An on-screen color wheel then appears at that location, enabling intuitive color adjustments. These changes are seamlessly integrated with RGB curves, simplifying advanced color grading. Further, "color grading" is to be interpreted as "color grading and image manipulation".

Further, the color grading system allows user interaction in which users can directly select any area of the image the users wish to adjust. Further, the users may directly select the area based on one or more ways of interaction with the area. Further, the one or more ways of interaction may include clicking, pointing, touching, etc. Further, the color grading system may perform automatic tonal range detection. In automatic tonal range detection, the system analyzes the pixel data to determine the tonal range or pixel brightness, upon clicking. The system classifies the area into one of three tonal ranges in the case of the 3-way color wheels or into one of five fixed-point tonal ranges in the case of RGB curves:

Shadows
Undertones (between Shadows and Midtones)
Midtones
Overtones (between Midtones and Highlights)
Highlights Further, the color grading system may provide on-screen color wheels. Further, an appropriate color wheel which is an on-screen color wheel, appears over the image at the click location and a cross hatch is added indicating and reminding the user where the change was made. Users can adjust the hue in the tonal range by moving the cursor/puck around the wheel. Further, the color grading system may allow integration with curves. Further, the curves may include red, green, and blue (RGB) curves, Luma (Y), Chroma (U), and Hue (V) (YUV) curves, Hue, Saturation, and Luminance (HSL) curves, Lightness, a—Red/Green and b—Blue/Yellow (Lab) curves, etc. Further, the curves have several components (HSL, LAB, etc.). Further, the curves correspond to one or more color spaces. Further, the one or more color spaces may include red, green, blue (RGB) color space, hue, saturation, value (HSV) color space, Hue, Saturation, and Luminance (HSL) color space, Lightness, a—Red/Green and b—Blue/Yellow (Lab) color space, Luma (Y), Chroma (U), and Hue (V) (YUV) color space, etc. Further, the integration with the curves includes translating adjustments made using the color wheel into modifications on the curves corresponding to the detected tonal range. This allows for precise and advanced color adjustments without the complexity of manual curve editing.

Further, the present disclosure describes a step-by-step process flow associated with the color grading system. Further, the step-by-step process flow includes:
1. The user clicks on the image area they want to adjust.
2. The system automatically detects the tonal range of that area.
3. An on-screen color wheel appears at the click location.
4. The user adjusts color properties by interacting with the on-screen color wheel. Further, the interacting with the on-screen color wheel includes dragging an indicator shown on the on-screen color wheel by one or more distances in one or more directions.
5. The adjustments are applied to the image and reflected in the 3-way color wheels or in the RGB curves.

The color grading system addresses issues of traditional color grading tools which require navigating separate controls and understanding complex concepts, by enabling direct on-image adjustments with automatic tonal range detection and intuitive on-screen color wheels, streamlining the workflow and making advanced techniques accessible.

Further, the color grading system has the following advantages:
Intuitive Interface: Users can make adjustments directly where they see the need, enhancing usability.
Efficiency: Reduces the number of steps and keeps the user's focus on the creative process.
Accessibility: Removes barriers for beginners while providing depth for experts.
Advanced Control: Integrates with RGB curves for precise adjustments without requiring manual curve manipulation. This serves as a starting point and users can manually adjust points on the RGB curves if they desire.

Further, the color grading system has the following advantages over known solutions:
1. Intuitive User Experience: The intuitive user experience includes direct on-image adjustments. In the direct on-image adjustments, the users interact directly with the image, making the process more natural and intuitive. Further, the intuitive user experience eliminates the requirement for an extensive understanding of tonal ranges and color theory, as the intuitive user experience does not need the user to have deep technical knowledge.
2. Automatic Tonal Range Detection: Automatic tonal range detection allows algorithmic precision, in which the system intelligently detects the appropriate tonal range based on user input, reducing errors and guesswork. Further, the automatic tonal range detection provides efficiency as the automatic tonal range detection speeds up the color grading process by automating tonal selection.
3. On-Screen Color Wheels Overlaid on Image: The on-screen color wheels overlaid on the image provide immediate feedback as the user may see the impact of adjustments in real-time directly on the image. Further, the on-screen color wheels overlaid on the image eliminate separate controls, as the on-screen color wheels overlaid on the image remove the need to shift focus to separate interfaces, maintaining creative flow.
4. Novel Integration with RGB Curves: The integration with the RGB curves provides extended controls by incorporating additional tonal ranges (undertones and overtones) seamlessly. Further, the integration with the RGB curves simplified advanced techniques by making complex RGB curve adjustments accessible through intuitive on-image interactions.
5. Streamlined Workflow: The streamlined workflow reduces steps in color grading by combining multiple actions into a single fluid process. Further, the color grading may include color grading and image manipulation. Further, the streamlined workflow allows for a faster learning curve as the streamlined workflow makes the color grading easier for beginners to adopt and understand.
6. Versatility: The versatility makes the color grading system for beginners and experts. Further, the versatility of the color grading system simplifies the process for novices while providing depth and efficiency for professionals.
7. Unique Innovation: The color grading system describes a method that has not been implemented in any other software solutions associated with color grading. Further, the color grading system offers a distinct advantage over existing tools.

Further, the color grading system has the following features:
1. Mechanism/Algorithm for Automatic Tonal Range Detection: The algorithm for automatic tonal range detection intelligently determines the tonal range (shadows, midtones, highlights, undertones, and overtones) based on where the user clicks on the image. Further, the mechanism/algorithm for automatic tonal range detection automates the selection of tonal ranges without user intervention or prior selection.
2. On-Screen Color Wheels Displayed Directly Over the Image: The on-screen color wheels displayed directly over the image provide an immediate appearance, as the appropriate color wheel appears at the location of the user's click. Further, the on-screen color wheels displayed directly over the image provide direct interaction as it enables users to make adjustments without leaving the image area.
3. Integration of Direct On-Image Adjustments with RGB Curves: The integration of direct on-image adjustments with RGB curves allows translating on-image color wheel adjustments into modifications on the RGB curves behind the scenes. Further, the integration of direct on-image adjustments with RGB curves provides extended tonal control by incorporating additional tonal ranges (5-way color tool) without increasing user complexity.
4. Simplified Workflow Process: The simplified workflow process reduces the steps in the color grading by combining tonal range detection, tool selection, and adjustment into a seamless process. Further, the simplified workflow process maintains the user's focus on the image, enhancing creative flow.

Intuitive User Interface Design: The intuitive user interface design provides overlaid controls in which color wheels and adjustments are overlaid on the image, not in separate panels. Further, the intuitive user interface design provides accessibility as it is designed to be easily understood and used by users with varying levels of expertise.

Further, the present disclosure describes an algorithmic method for facilitating editing of images. Further, the algorithmic method may be used for detecting the tonal range based on user input. Further, the algorithmic method may include a method and/or an algorithm.

Further, the present disclosure describes a process flow for facilitating editing of images. Further, the process flow may include a sequence of actions starting from user input (click) on the images to tonal range detection, displaying the appropriate color wheel on the images, and applying adjustments to the images.

Further, the present disclosure describes an integration technique with RGB curves for facilitating editing of images. Further, the integration technique may include a method of translating on-image adjustments into RGB curve modifications.

Further, the present disclosure describes user interface elements for facilitating editing of images. Further, the user interface elements may include on-screen color wheels. Further, the design and functionality of the on-screen color wheels appear over the image based on the context.

Further, the present disclosure describes an innovative color grading system that allows users to make color adjustments directly on the image. When a user clicks on a specific area, the system automatically detects the tonal range and, in a novel way, displays the appropriate on-screen color wheel over the image itself, enabling intuitive color changes. This also integrates with RGB curves, enhancing advanced color grading.

Further, the present disclosure describes a method of color grading that is intuitive, efficient, and accessible. Further, the method of color grading allows users to interact directly with the image. Further, the method of color grading eliminates the necessity for deep technical knowledge, reduces workflow complexity, and maintains the user's focus on the creative aspects of editing. This method of color grading benefits beginners by lowering the learning curve and experts by streamlining their workflow.

Further, the method of color grading provides direct on-image interaction, automatic tonal range detection, novel on-screen color wheels, novel integration with RGB curves, simplified workflow, and enhanced accessibility. Further, users make color adjustments by clicking directly on the image, keeping focus on the creative content based on the direct on-image interaction. Further, the automatic tonal range detection may employ an algorithm that intelligently determines the appropriate tonal range (shadows, midtones, highlights, undertones, and overtones) based on where the user clicks. Further, the novel on-screen color wheels are displayed over the image. Further, the novel on-screen color wheels may include an appropriate color wheel that appears directly at the click location to allow immediate and intuitive adjustments. Further, the novel integration with the RGB curves extends traditional 3-way color grading to include additional tonal ranges without increasing complexity, translates intuitive on-image adjustments to RGB curves behind the scenes, and makes advanced color grading techniques accessible without requiring manual manipulation of curves. Further, the simplified workflow reduces the number of steps involved in color grading, eliminates the need to navigate separate interfaces or controls, and accelerates the process for experts and makes it approachable for beginners. Further, the enhanced accessibility removes the barrier of needing deep technical knowledge and allows users to achieve professional results with intuitive interactions.

Further, the method of color grading, as described in the present disclosure, uses specific tonal ranges that are defined as ranges (e.g. shadows, undertones, midtones, overtones, and highlights) at 5 fixed points and then utilize an on-screen display (OSD) hue wheel instead of using an exact luminance sampling value for working with only the RGB curves and utilizing a slider user interface (UI).

Further, the present disclosure describes editing of the image based on interactions with the video scopes. Further, the interactions may include direct interaction with the trace in the video scopes. Further, the editing may be based on clicking on pixel information to make color changes.

Further, the present disclosure describes scopes based grading system based on 5 tonal ranges for both waveform and RGB parade.

Further, the method of color grading, as described in the present disclosure, is an improvement on historical approaches of color grading as the historical approaches have physical dependencies, complex interfaces, indirect control mechanisms, lack of intuitive tools, and unintuitive advanced techniques. Further, the physical dependencies may include reliance on costly physical hardware, which limits accessibility. Further, the complex interfaces may result from the replication of complex hardware interfaces through virtual tools without improving usability. Further, the lack of intuitive tools may result from an absence of tools that offer direct on-image adjustments with automatic tonal detection. Further, the unintuitive advanced techniques may result from an inaccessibility of tools like RGB curves to users without extensive training.

In some embodiments, the present disclosure describes an enablement of direct interaction with video scopes representing a trace information associated with an image or a video.

In some embodiments, the present disclosure describes a depth map generation. The depth map enables users to select a target subject in the foreground, allowing precise adjustments to lighting parameters (such as luminance and hue/saturation) on that subject while leaving the background unaffected.

Further, by employing AI-generated depth maps, the system achieves enhanced precision by separating foreground and background elements, allowing users to apply adjustments solely to the selected subject. This secondary feature enhances accuracy while depending on the primary interaction capability with video scopes.

Further, the present disclosure describes a system that is scalable and capable of accommodating various video formats and resolutions while maintaining its core functionality of AI-based depth map generation and subject isolation. Further, the system seamlessly integrates with existing workflows by offering an intuitive point-and-click interface compatible with standard video editing or post-production environments.

Further, the system dynamically adapts to changes in content, such as moving subjects or shifting lighting conditions, while maintaining its ability to isolate and adjust specific areas of a scene. This dynamic handling enhances flexibility and ensures consistent performance across various use cases.

In some embodiments, the system enables direct interaction with video scopes by allowing users to click on pixels to modify color settings. This feature extends traditional scope use by enabling precise, localized color changes, improving upon conventional methods which often require manual adjustments or extensive menu navigation.

In some embodiments, the system incorporates AI-generated depth maps to isolate subjects within a scene. This is achieved through machine learning algorithms that analyze pixel intensity and spatial information, allowing for targeted adjustments without affecting the background. The depth map can be dynamically updated based on user input or scene changes.

In some embodiments, an on-screen user interface appears near user selections, enhancing accessibility and responsiveness. This feature reduces the need for navigating through menus by allowing direct adjustments at the point of click, thereby improving user efficiency and experience.

In some embodiments, the system enables precise adjustments to lighting (luma) and color parameters specifically on foreground subjects. This is accomplished using selective color correction algorithms that apply changes only to selected regions, allowing for novel scene relighting effects in post-production.

In some embodiments, a 5-tonal range grading system is utilized for both waveform and RGB parade displays. This provides detailed control over color correction, enabling users to achieve precise visual effects through an intuitive graphical interface with sliders or dials.

In some embodiments, the system dynamically maps user interactions to multiple pixels within a defined area, allowing for efficient batch adjustments. This method enhances the speed and accuracy of color modifications, particularly in large scenes.

In some embodiments, the system employs adaptive algorithms that adjust color correction based on scene-specific lighting conditions. This feature ensures that corrections are contextually appropriate, reducing the need for constant manual tweaking.

In some embodiments, the system provides immediate visual feedback when pixels are adjusted, allowing users to monitor changes in real-time. This feature improves workflow efficiency and user confidence by providing clear outcomes.

n some embodiments, customizable presets are available, enabling users to save and recall specific color settings for different scenes or lighting conditions. This reduces the time required for setting up new projects and enhances consistency across productions.

In some embodiments, interactive tutorials and tooltips guide users through advanced features, ensuring proper application of adjustments. These tools are especially beneficial for users transitioning from traditional methods to digital tools.

In some embodiments, face recognition technology is integrated to automatically apply color corrections on detected faces, enhancing the efficiency of scene adjustments without manual selection. Further, in some embodiments, augmented reality modes overlay guides or reference images onto the video scope view, providing spatial context and aiding in accurate pixel adjustments. Further, in some embodiments, the system integrates with third-party software via APIs, enabling seamless workflow between applications like video editing suites and design tools. Further, in some embodiments, scene analysis automation is employed to detect lighting conditions, color palettes, and subjects, providing initial adjustments and guiding users toward desired outcomes.

In some embodiments, context-aware algorithms adjust color corrections based on the visual context of the scene, such as dominant colors or artistic styles, enhancing the quality of adjustments.

FIG. 1 is an illustration of an online platform 100 consistent with various embodiments of the present disclosure. By way of non-limiting example, the online platform 100 to facilitate editing of images may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a software application or browser. The software application may be embodied as, for example, but not be limited to, a website, a web application, a desktop application, and a mobile application compatible with a computing device 200.

Figure 2:
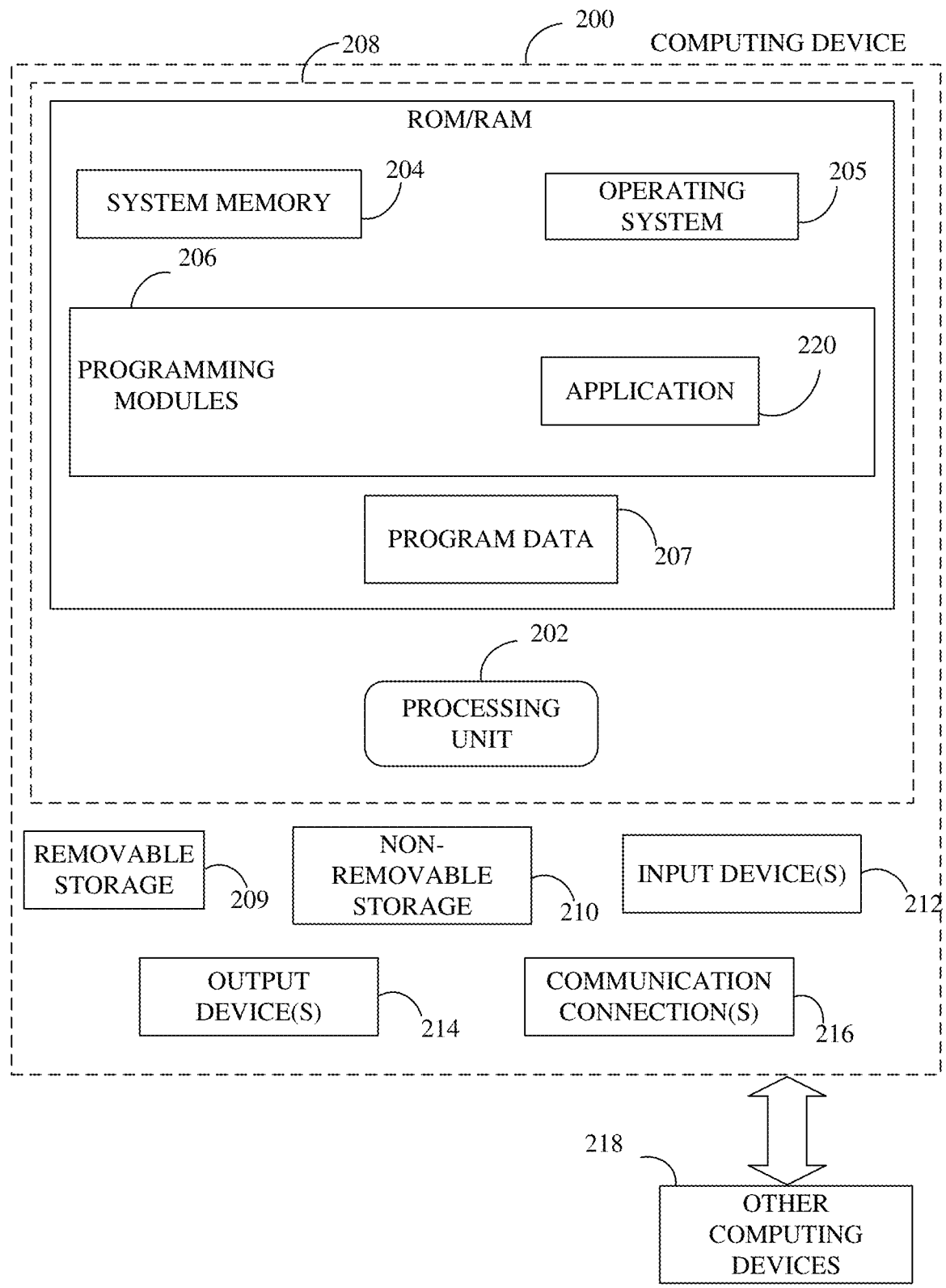
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Further, the at least one processing unit 202 may include a central processing unit, a graphics processing unit, one or more accelerators (such as a graphics processing unit (GPU) accelerator), etc. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module, etc. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable, and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3A:
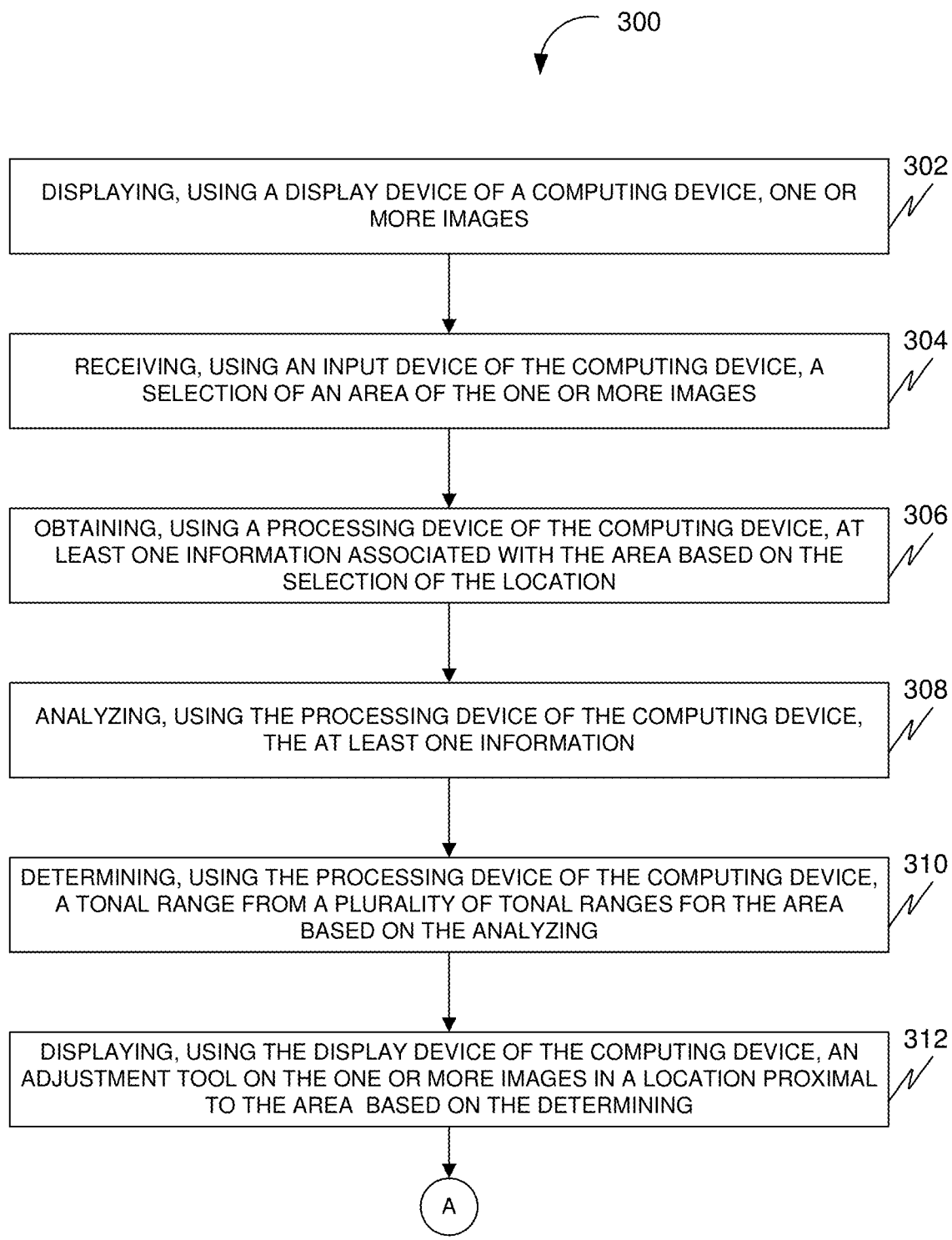
FIG. 3A illustrates a flowchart of a method 300 for facilitating editing of images, in accordance with some embodiments.
Figure 3B:
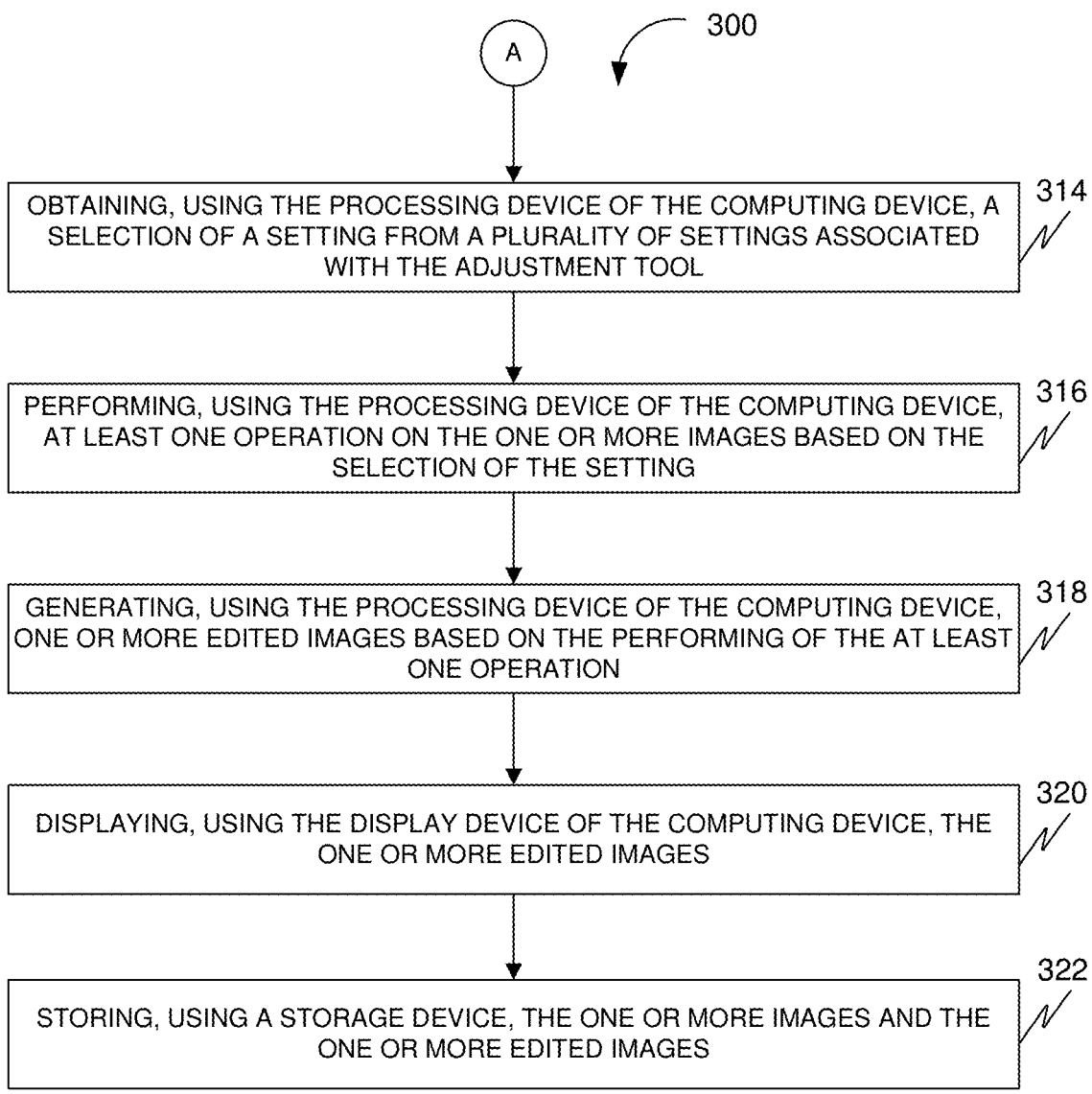
FIG. 3B illustrates a continuation of the flowchart of the method 300 for facilitating editing of images, in accordance with some embodiments.

FIG. 3A and FIG. 3B illustrate a flowchart of a method 300 for facilitating editing of images, in accordance with some embodiments. Further, the editing may include adjusting, correcting, balancing, modifying, etc.

Accordingly, the method 300 may include a step 302 of displaying, using a display device of a computing device, one or more images. Further, the one or more images may include a sequence of images, a sequence of consecutive images, a single image, etc. Further, the one or more images may be displayed in a user interface. Further, the user interface may include a graphical user interface. Further, the method 300 may include a step 304 of receiving, using an input device of the computing device, a selection of an area of the one or more images. Further, the area may include a region of the one or more images. Further, the selection of the area may be received using a selection indicator displayed on the one or more images. Further, the selection corresponds to a click, a point, a touch, etc., received corresponding to the area. Further, the selection indicator moves over the one or more images and locates the area of the one or more images based on an input from a user using an input device. Further, the selection indicator may be overlaid on the one or more images. Further, the method 300 may include a step 306 of obtaining, using a processing device of the computing device, one or more information associated with the area based on the selection of the location. Further, the obtaining of the one or more information may include determining the one or more information. Further, the one or more information may include a pixel information of one or more pixels of the one or more images associated with the area. Further, the pixel information may include color information associated with a color of the one or more pixels, a brightness information associated with a brightness of the one or more pixels, a hue information associated with a hue of the one or more pixels, a saturation information associated with a saturation of the one or more pixels, etc. Further, the method 300 may include a step 308 of analyzing, using the processing device of the computing device, the one or more information. Further, the method 300 may include a step 310 of determining, using the processing device of the computing device, a tonal range from two or more tonal ranges for the area based on the analyzing. Further, the tonal range corresponds to a tonality. Further, the tonal range corresponds to a tonal value. Further, the determining of the tonal range may include detecting the tonal range of the area. Further, the determining of the tonal range may include appropriately selecting the tonal range from the plurality of tonal ranges for the area. Further, the method 300 may include a step 312 of displaying, using the display device of the computing device, an adjustment tool on the one or more images in a location proximal to the area based on the determining. Further, the displaying of the adjustment tool may include overlaying the adjustment tool on the one or more images. Further, the adjustment tool may include a graphical user interface element. Further, the adjustment tool may be displayed using the user interface. Further, the method 300 may include a step 314 of obtaining, using the processing device of the computing device, a selection of a setting from two or more settings associated with the adjustment tool. Further, the setting corresponds to a level of hue for a hue, a level of saturation for a saturation, etc. Further, the method 300 may include a step 316 of performing, using the processing device of the computing device, one or more operations on the one or more images based on the selection of the setting. Further, the at least one operation may include a color adjustment, a color correction, a color grading and image manipulation, a color balance, a tonal range adjustment, an adjustment, a correction, etc. Further, the at least one operation may include a level and/or a degree and/or a type of the color adjustment, the color correction, the color grading, the color balance, the tonal range adjustment, etc. Further, the level and/or the degree and/or the type corresponds to the setting. Further, the at least one operation corresponds to the setting. Further, the performing of the at least one operation may include modifying one or more attributes of the one or more images and/or the area of the one or more images and/or one or more areas associated with the area of the one or more images. Further, the one or more attributes may include a brightness, a contrast, a saturation, a tone, a hue, a balance, etc. Further, the performing of the at least one operation corresponds to a change in a degree of the one or more attributes. Further, the method 300 may include a step 318 of generating, using the processing device of the computing device, one or more edited images based on the performing of the one or more operations. Further, the method 300 may include a step 320 of displaying, using the display device of the computing device, the one or more edited images. Further, the method 300 may include a step 322 of storing, using a storage device of the computing device, the one or more images and the one or more edited images.

In some embodiments, the method 300 may further include displaying, using the display device of the computing device, an adjustment indication on the area of the one or more images indicating the performing of the one or more operations.

In some embodiments, the two or more tonal ranges include shadows, undertones, midtones, overtones, and highlights. Further, the two or more tonal ranges may include two or more first tonal ranges between the shadows and the highlights.

In some embodiments, the method 300 may further include selecting, using the processing device of the computing device, the adjustment tool from two or more adjustment tools based on the tonal range. Further, the displaying of the adjustment tool may be based on the selecting of the adjustment tool.

In some embodiments, the method 300 may further include identifying, using the processing device of the computing device, one or more areas of the one or more images associated with the tonal range based on the determining of the tonal range of the area. Further, the performing of the one or more operations includes performing the one or more operations on the one or more areas of the one or more images. Further, the generating of the one or more edited images may be based on the performing of the one or more operations on the one or more areas of the one or more images.

In some embodiments, the adjustment tool includes a wheel. Further, the wheel displays a spectrum of hues around a perimeter of the wheel. Further, the wheel displays an indication at a center of the wheel. Further, the method 300 includes receiving, using the input device of the computing device, a vector input from the wheel. Further, the vector input includes a vector from the center of the wheel towards a hue for a distance from the center. Further, the obtaining of the selection of the setting may be based on the vector input.

Figure 4:
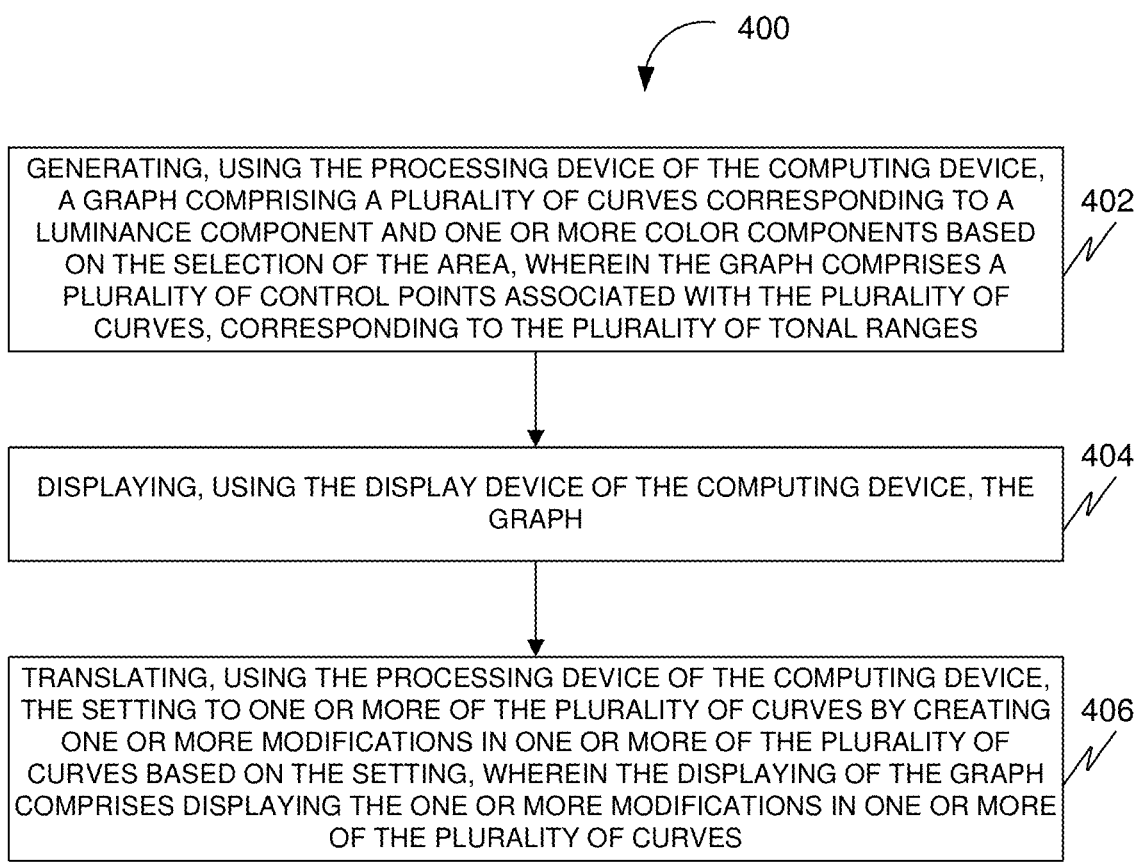
FIG. 4 illustrates a flowchart of a method 400 for facilitating editing of images including translating, using the processing device of the computing device, the setting to one or more of the plurality of curves by creating one or more modifications in one or more of the plurality of curves, in accordance with some embodiments.

FIG. 4 illustrates a flowchart of a method 400 for facilitating editing of images including translating, using the processing device of the computing device, the setting to one or more of the plurality of curves by creating one or more modifications in one or more of the plurality of curves, in accordance with some embodiments.

Further, in some embodiments, the method 400 further may include a step 402 of generating, using the processing device of the computing device, a graph comprising two or more curves corresponding to a luminance component and one or more color components based on the selection of the area. Further, the graph includes two or more control points associated with the two or more curves, corresponding to the two or more tonal ranges. Further, the two or more control points may include two or more fixed points on the two or more curves. Further, the graph may be a graphical user interface element. Further, in some embodiments, the method 400 may include a step 404 of displaying, using the display device of the computing device, the graph. Further, in some embodiments, the method 400 may include a step 406 of translating, using the processing device of the computing device, the setting to one or more of the two or more curves by creating one or more modifications in one or more of the two or more curves based on the setting. Further, the one or more modifications may be based on the two or more control points. Further, the displaying of the graph includes displaying the one or more modifications in one or more of the two or more curves.

Figure 5:
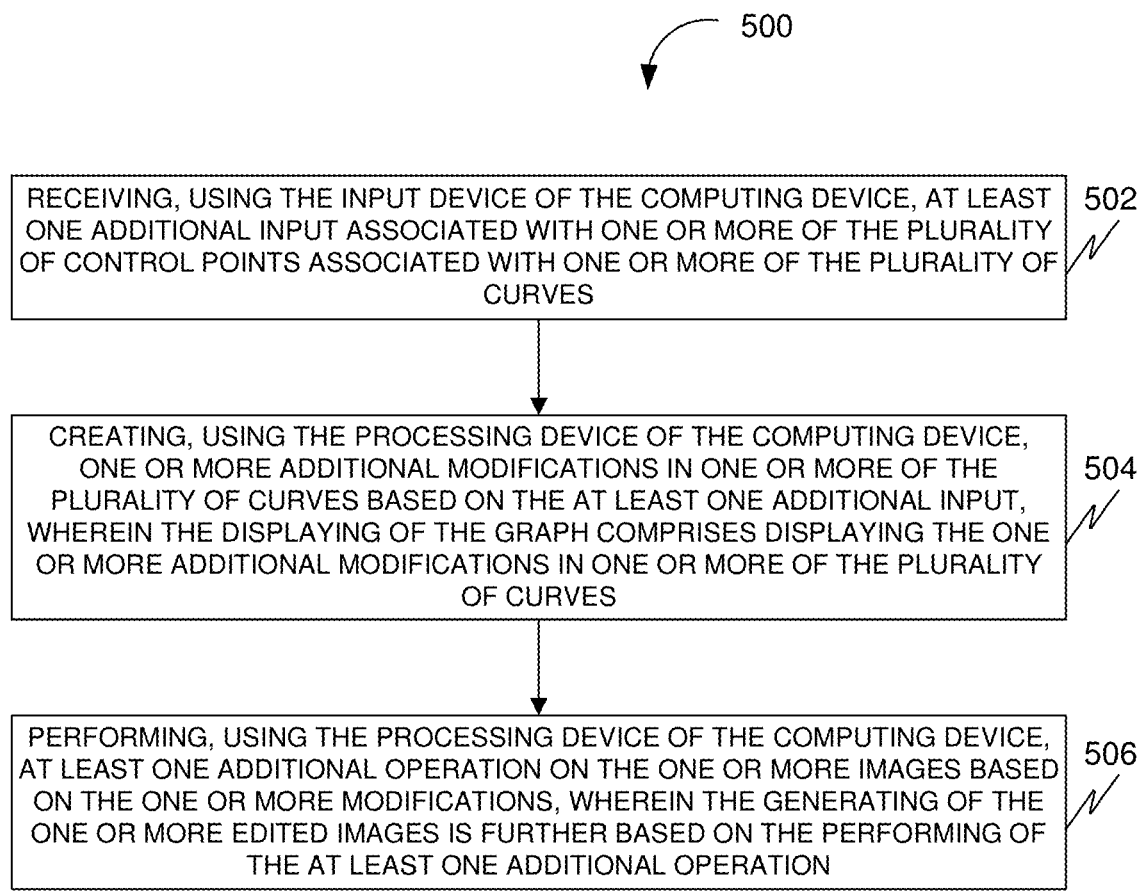
FIG. 5 illustrates a flowchart of a method 500 for facilitating editing of images including performing, using the processing device of the computing device, at least one additional operation on the one or more images, in accordance with some embodiments.

FIG. 5 illustrates a flowchart of a method 500 for facilitating editing of images including performing, using the processing device of the computing device, at least one additional operation on the one or more images, in accordance with some embodiments.

Further, in some embodiments, the method 500 may include a step 502 of receiving, using the input device of the computing device, one or more additional inputs associated with one or more of the two or more control points associated with one or more of the two or more curves. Further, the one or more additional inputs may be associated with the two or more control points. Further, in some embodiments, the method 500 may include a step 504 of creating, using the processing device of the computing device, one or more additional modifications in one or more of the two or more curves based on the one or more additional inputs. Further, the creating of the one or more additional modifications may be based on the two or more control points. Further, the displaying of the graph includes displaying the one or more additional modifications in one or more of the two or more curves. Further, in some embodiments, the method 500 may include a step 506 of performing, using the processing device of the computing device, one or more additional operations on the one or more images based on the one or more modifications. Further, the generating of the one or more edited images may be based on the performing of the one or more additional operations.

In some embodiments, the analyzing of the one or more information includes analyzing the one or more information using one or more intelligent algorithms. Further, the determining of the tonal range may be based on the analyzing of the one or more information using the one or more intelligent algorithms.

Figure 6:
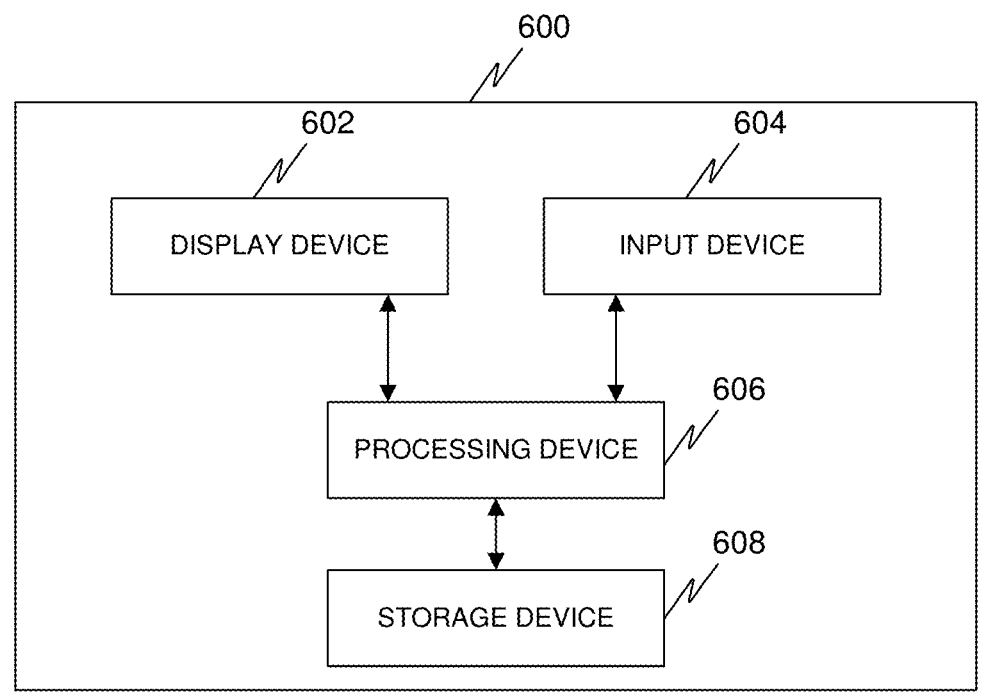
FIG. 6 illustrates a block diagram of a system 600 for facilitating editing of images, in accordance with some embodiments.

FIG. 6 illustrates a block diagram of a system 600 for facilitating editing of images, in accordance with some embodiments. Further, the system 600 may include a computing device.

Accordingly, the system 600 may include a display device 602. Further, the display device 602 may include an output device, a client device, a device, etc. Further, the display device 602 may be configured for displaying one or more images. Further, the display device 602 may be configured for displaying an adjustment tool on the one or more images in a location proximal to the area based on determining a tonal range from two or more tonal ranges for the area. Further, the display device 602 may be configured for displaying one or more edited images. Further, the system 600 may include an input device 604 which may be configured for receiving a selection of an area of the one or more images. Further, the input device 604 may include a client device, a device, etc. Further, the system 600 may include a processing device 606 communicatively coupled with the display device 602 and the input device 604. Further, the processing device 606 may be configured for obtaining one or more information associated with the area based on the selection of the location. Further, the processing device 606 may be configured for analyzing the one or more information. Further, the processing device 606 may be configured for the determining of the tonal range from the two or more tonal ranges for the area based on the analyzing. Further, the processing device 606 may be configured for obtaining a selection of a setting from two or more settings associated with the adjustment tool. Further, the processing device 606 may be configured for performing one or more operations on the one or more images based on the selection of the setting. Further, the processing device 606 may be configured for generating the one or more edited images based on the performing of the one or more operations. Further, the system 600 may include a storage device 608 communicatively coupled with the processing device 606. Further, the storage device 608 may be configured for storing the one or more images and the one or more edited images.

In some embodiments, the adjustment tool includes a wheel. Further, the wheel displays a spectrum of hues around a perimeter of the wheel. Further, the wheel displays an indication at a center of the wheel. Further, the input device 604 may be configured for receiving a vector input from the wheel. Further, the vector input includes a vector from the center of the wheel towards a hue for a distance from the center. Further, the obtaining of the selection of the setting may be based on the vector input.

According to some embodiments, a non-transitory computer-readable medium storing one or more instructions which, when executed by a processing device of a computing device, causes the computing device to perform a method for facilitating editing of images is disclosed. Further, the one or more instructions may include a code, a function, a program, etc. Further, the processing device may include a processor, a microprocessor, a microcontroller, a processing unit, etc. Further, the computing device may include a client device, a user device, etc. Further, the computing device may include a server. Further, the method may include operations performed by the computing device. Further, the method may include a method for direct on-image color grading method, a method of color grading, a color grading method, a step-by-step process flow associated with a color grading system, a method associated with a color grading system, a process flow associated with a color grading system, etc. Further, the method may include providing a user interface (such as a graphical user interface) for facilitating the editing of the images. Further, the editing may include adjusting, correcting, balancing, modifying, etc. Further, the method may include displaying one or more images. Further, the one or more images may include a sequence of images, a sequence of consecutive images, a single image, etc. Further, the one or more images may be displayed in a user interface. Further, the user interface may include a graphical user interface. Further, the method may include receiving a selection of an area of the one or more images. Further, the area may include a region of the one or more images. Further, the selection of the area may be received using a selection indicator displayed on the one or more images. Further, the selection indicator moves over the one or more images and locates the area of the one or more images based on an input from a user using an input device. Further, the selection indicator may be overlaid on the one or more images. Further, the method may include obtaining at least one information associated with the area based on the selection of the location. Further, the at least one information may include a pixel information of one or more pixels of the one or more images associated with the area. Further, the pixel information may include color information associated with a color of the one or more pixels, a brightness information associated with a brightness of the one or more pixels, a hue information associated with a hue of the one or more pixels, a saturation information associated with a saturation of the one or more pixels, etc. Further, the method may include analyzing the at least one information. Further, the method may include determining a tonal range from a plurality of tonal ranges for the area based on the analyzing. Further, the tonal range corresponds to a tonal value. Further, the determining of the tonal range may include detecting the tonal range of the area. Further, the determining of the tonal range may include appropriately selecting the tonal range from the plurality of tonal ranges for the area. Further, the method may include displaying an adjustment tool on the one or more images in a location proximal to the area based on the determining. Further, the displaying of the adjustment tool may include overlaying the adjustment tool on the one or more images. Further, the adjustment tool may include a graphical user interface element. Further, the adjustment tool may be displayed using the user interface. Further, the method may include obtaining a selection of a setting from a plurality of settings associated with the adjustment tool. Further, the setting corresponds to a level of hue for a hue, a level of saturation for a saturation, etc. Further, the method may include performing at least one operation on the one or more images based on the selection of the setting. Further, the at least one operation may include a color adjustment, a color correction, a color grading, a color balance, a tonal range adjustment, an adjustment, a correction, etc. Further, the at least one operation may include a level and/or a degree and/or a type of the color adjustment, the color correction, the color grading, the color balance, the tonal range adjustment, etc. Further, the level and/or the degree and/or the type corresponds to the setting. Further, the at least one operation corresponds to the setting. Further, the performing of the at least one operation may include modifying one or more attributes of the one or more images and/or the area of the one or more images and/or one or more areas associated with the area of the one or more images. Further, the one or more attributes may include a brightness, a contrast, a saturation, a tone, a hue, a balance, etc. Further, the performing of the at least one operation corresponds to a change in a degree of the one or more attributes. Further, the at least one operation may be performed in real time. Further, the method may include generating one or more edited images based on the performing of the at least one operation. Further, the one or more edited images may be generated in real time. Further, the method may include displaying the one or more edited images. Further, the generating of the one or more edited images provides a real time feedback of the performing of the at least one operation.

Further, the editing of the one or more images by the displaying of the adjustment tool on the one or more images proximal to the area for the performing of the at least one operation provides an intuitive user experience for the editing of the one or more images.

Further, in an embodiment, the at least one adjustment may be applied to the area without affecting other areas of the one or more images.

Further, in some embodiment, the method may include receiving, by one or more applications, the one or more images from one or more devices. Further, the one or more devices may include a camera, a user device, a computing device, a client device, etc. Further, the displaying of the one or more images may be based on the receiving of the one or more images. Further, the one or more applications may include a software application. Further, the one or more applications may be executed on the one or more devices. Further, the one or more applications may include a messaging application. Further, the messaging application may be communicatively coupled with one or more messaging applications executed on one or more external devices. Further, the one or more external devices may include a computing device, a client device, a server, etc. Further, the messaging application communicates with the one or more messaging applications for receiving and transmitting one or more content (such as images, etc.) between the one or more devices and the one or more external devices.

Further, in some embodiments, the displaying of the adjustment tool may include displaying the adjustment tool for a duration. Further, the method may include removing the adjustment tool from the image after the duration. Further, the adjustment tool may be removed after the obtaining of the setting.

Further, in some embodiments, the plurality of tonal ranges may include shadows, undertones, midtones, overtones, and highlights. Further, the one or more tonal ranges may include one or more predefined tonal ranges and one or more user defined tonal ranges. Further, the one or more predefined tonal ranges may include the shadows, the midtones, and the highlights. Further, the one or more user defined tonal ranges may include undertones and the overtones. Further, the plurality of tonal ranges corresponds to a plurality of brightness level ranges for a plurality of portions of the one or more images. Further, the shadows correspond to a lowest brightness level range, the highlights correspond to a highest brightness level range, and the midtones correspond to a middle brightness level range. Further, the middle brightness level range may be greater than the lowest brightness level range and less than the highest brightness level range. Further, the undertones may be associated with a first brightness level range and the overtones may be associated with a second brightness level range. Further, the first brightness level range may be greater than the lowest brightness level range and less than the middle brightness level range. Further, the second brightness level range may be greater than the middle brightness level range and less than the highest brightness level range.

Further, in an embodiment, the method may include receiving an input. Further, the method may include determining the one or more user defined tonal ranges based on the input.

In further embodiments, the method may include selecting the adjustment tool from a plurality of adjustment tools based on the tonal range. Further, the plurality of adjustment tools may include controls for the editing the one or more images. Further, the displaying of the adjustment tool may be based on the selecting of the adjustment tool. Further, the plurality of adjustment tools may correspond to the plurality of tonal ranges. Further, the plurality of adjustment tools may include a shadows adjustment tool, an undertones adjustment tool, a midtones adjustment tool, an overtones adjustment tool, and a highlights adjustment tool. Further, the plurality of adjustment tools may include on-screen color wheels, color wheels, etc. Further, the plurality of adjustment tools may include a red-green-blue (RGB) curves tool.

In further embodiments, the method may include identifying one or more areas of the one or more images associated with the tonal range based on the determining of the tonal range of the area. Further, the performing of the at least one operation may include performing the at least one operation on the one or more areas of the one or more images. Further, the generating of the one or more edited images may be based on the performing of the at least one operation on the one or more areas of the one or more images. Further, the one or more areas may include the area.

Further, in some embodiments, the adjustment tool may include a wheel. Further, the wheel may include an on-screen color wheel. Further, the wheel displays a spectrum of hues around a perimeter of the wheel. Further, the wheel displays an indication at a center of the wheel. Further, the method may include receiving a vector input from the wheel. Further, the vector input may include a vector from the center of the wheel towards a hue for a distance from the center. Further, the vector corresponds to an angle from a reference of the wheel. Further, the distance corresponds to a magnitude. Further, the angle indicates a particular hue from the spectrum of the hues and the magnitude indicates a level and/or a degree of saturation corresponding to the particular hue. Further, the obtaining of the selection of the setting may be based on the vector input. Further, the setting corresponds to the particular hue, and the level of saturation corresponding to the particular hue. Further, the obtaining of the setting may include at least one of determining and generating the setting based on the vector input. Further, the obtaining of the setting may include selecting the setting from the plurality of settings.

The displaying of the wheel on the one or more images for the editing of the one or more images through receiving the vector input which includes the vector and the distance enhances the user's ability to provide a precise setting intuitively for the performing of the at least one operation corresponding to the setting.

In further embodiments, the method may include generating a graph comprising a plurality of curves corresponding to a luminance component and one or more color components based on the selection of the area. Further, the luminance component and the one or more color components may correspond to one or more color spaces and/or one or more color models. Further, the graph may include a graphical user interface element. Further, the graph may not be displayed on the one or more images. Further, the graph may be displayed on the user interface alongside the one or more images. Further, the luminance component corresponds to a brightness. Further, the two or more curves may correspond to a hue component, a saturation component, a value component, a luma component, a chroma component, etc. Further, the one or more color components may include one or more colors such as a red color, a blue color, a green color, a yellow color, a cyan color, a magenta color, a black color, a white color, etc. Further, the one or more color components correspond to one or more color channels corresponding to the one or more colors. Further, the graph may be a 5-way color tool. Further, the one or more color components may include a red color component, a green color component, and a blue color component. Further, the red color component corresponds to a red color channel, the green color component corresponds to a green color channel, and the blue color component corresponds to a blue color component. Further, the graph may include a plurality of control points associated with the plurality of curves, corresponding to the plurality of tonal ranges. Further, the method may include displaying the graph. Further, the method may include translating the setting to one or more of the plurality of curves by creating one or more modifications in one or more of the plurality of curves based on the setting. Further, the translating of the setting may include reflecting the setting to one or more of the plurality of curves. Further, the displaying of the graph may include displaying the one or more modifications in one or more of the plurality of curves. Further, the one or more modifications correspond to an intensity of the luminance component and the one or more color components based on one or more of the plurality of control points.

In further embodiments, the method may include receiving at least one additional input associated with one or more of the plurality of control points associated with one or more of the plurality of curves. Further, the method may include creating one or more additional modifications in one or more of the plurality of curves based on the at least one additional input. Further, the displaying of the graph may include displaying the one or more additional modifications in one or more of the plurality of curves. Further, the one or more additional modifications may include a curve editing of one or more of the plurality of curves. Further, the method may include performing at least one additional operation on the one or more images based on the one or more modifications. Further, the generating of the one or more edited images may be based on the performing of the at least one additional operation. Further, the at least one additional operation may include an additional adjustment, an additional correction, an additional color grading, etc. through the graph. Further, the graph allows a user to make finer adjustments/corrections/color grading to the one or more images. Further, the one or more additional modifications corresponds to an intensity of the luminance component and the one or more color components based on one or more of the plurality of control points.

In further embodiments, the method may include displaying an adjustment indication on the area of the one or more images indicating the performing of the at least one operation. Further, the adjustment indication may include a graphical user interface element. Further, the displaying of the adjustment indication may include overlaying the adjustment indication on the area of the one or more images. Further, the adjustment indication indicates a performance of the at least one operation associated with the area. Further, the adjustment indication may correspond to a previous editing made to a previous area of the one or more images. Further, the displaying of the adjustment indication may include continuously displaying the adjustment indication during the receiving of the selection of the area of the one or more images.

Further, in some embodiments, the analyzing of the at least one information may include analyzing the at least one information using at least one intelligent algorithm. Further, the determining of the tonal range may be based on the analyzing of the at least one information using the at least one intelligent algorithm. Further, the at least one intelligent algorithm may include a tonal range algorithm.

Further, in an embodiment, the at least one intelligent algorithm automatically analyzes the one or more images, detects a plurality of areas of the one or more images, and dynamically classifies each of the plurality of areas using at least one of the plurality of tonal ranges based on a set of predefined categories. Further, at least one of the plurality of areas corresponds to at least one of the plurality of tonal ranges. Further, the at least one intelligent algorithm matches the area to at least one of the plurality of areas based on the dynamically classifying.

Further, in an embodiment, the at least one intelligent algorithm may include a machine learning algorithm. Further, the machine learning algorithm may include a Region-Based Convolutional Neural Network (R-CNN). Further, the machine learning algorithm may be comprised in one or more machine learning models.

Figure 7:
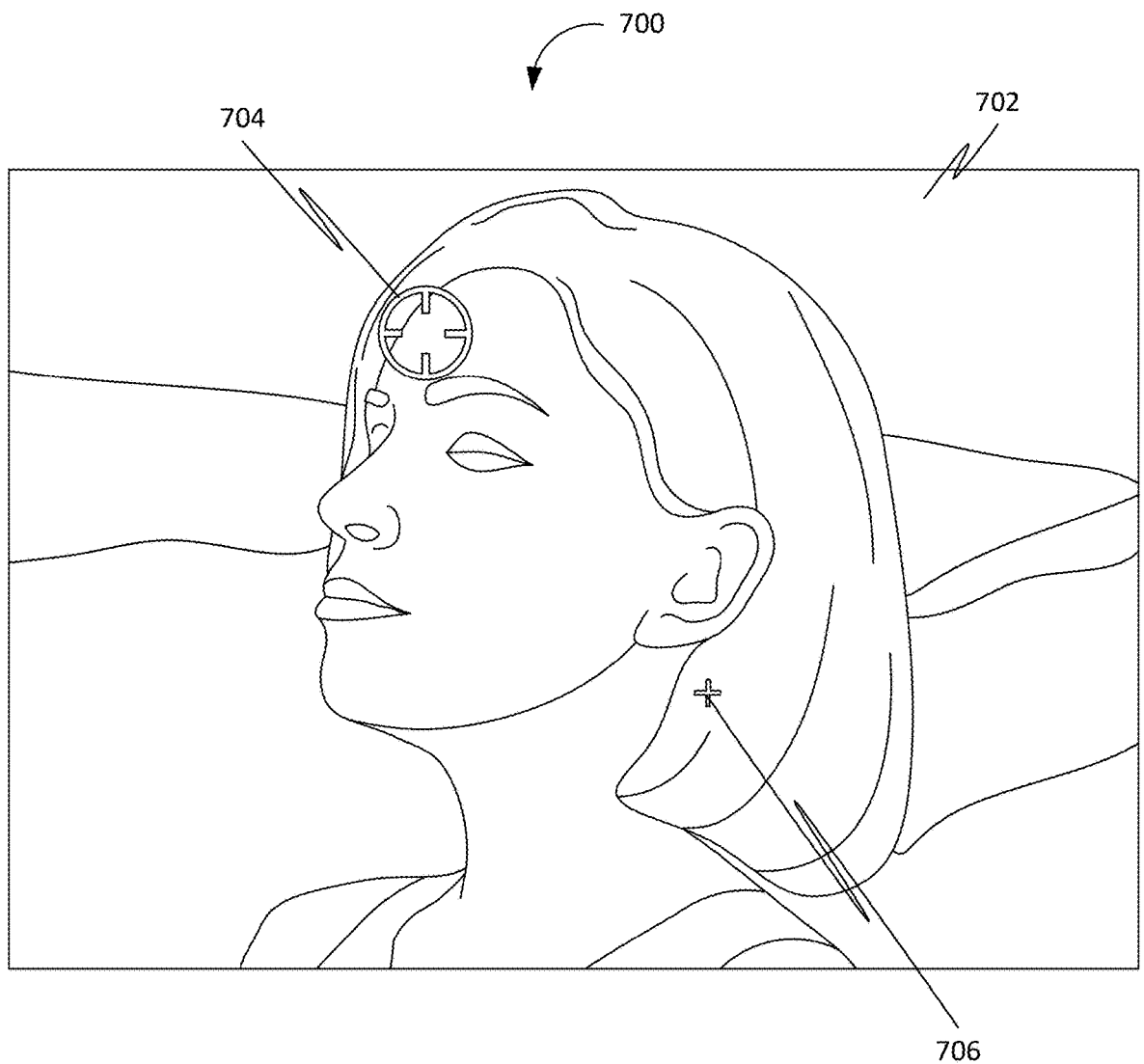
FIG. 7 illustrates a user interface 700 for facilitating editing of images, in accordance with some embodiments.

FIG. 7 illustrates a user interface 700 for facilitating editing of images, in accordance with some embodiments. Further, the user interface 700 may include an image 702. Further, the user interface 700 may include a selection indication 704 for selecting an area of the image 702.

Further, the user interface 700 may include an edited indication 706 for indicating a previous area of the image 702 selected for the editing of the image 702.

Figure 8:
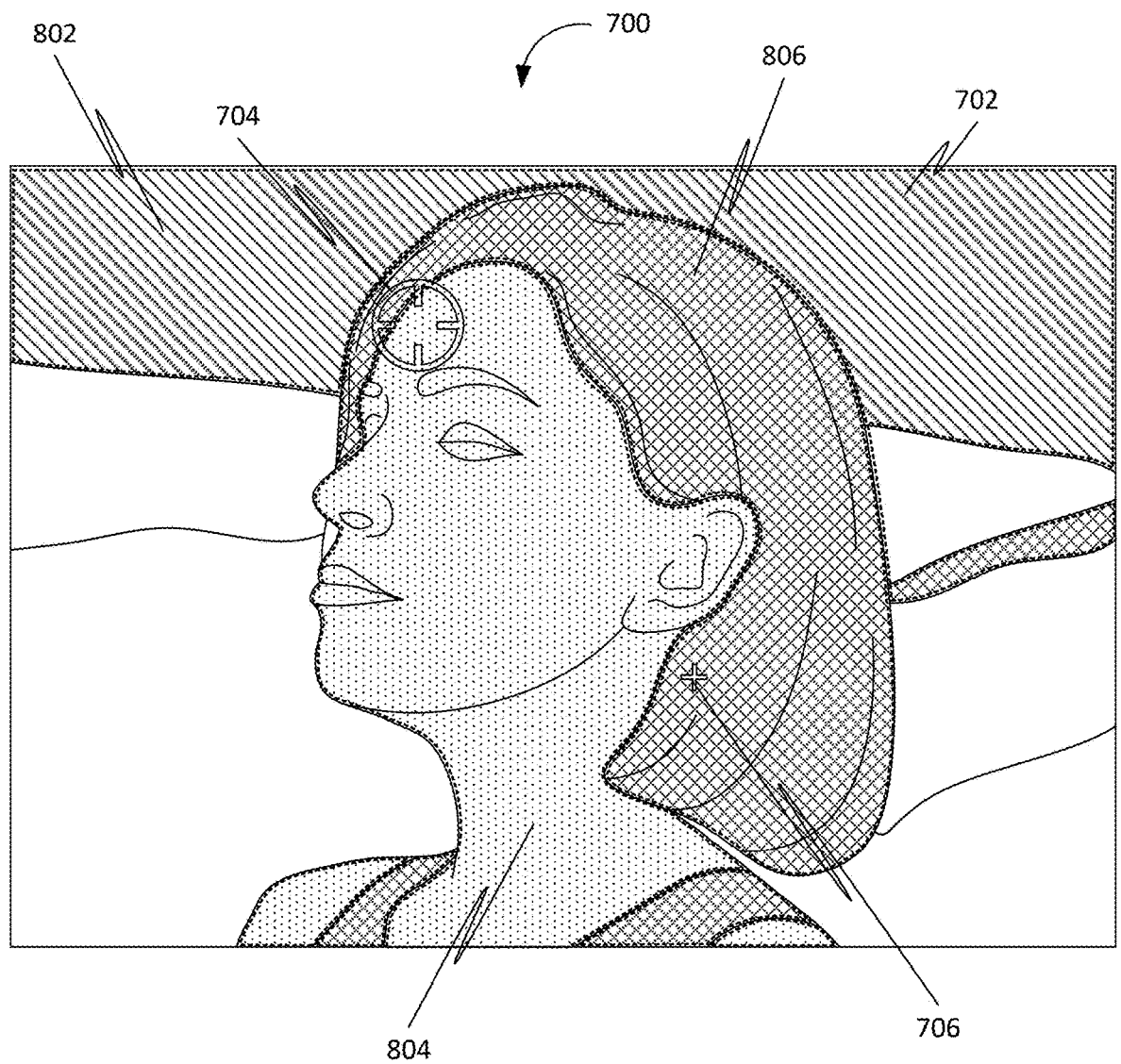
FIG. 8 illustrates the user interface 700 for facilitating the editing of the images, in accordance with some embodiments.

FIG. 8 illustrates the user interface 700 for facilitating the editing of the images, in accordance with some embodiments. Further, the user interface 700 identifies one or more areas 802-806 of the image 702 associated with one or more tonal ranges. Further, the one or more tonal ranges may include highlights, undertones, midtones, hightones, and shadows. Further, the one or more areas 802-806 may include a first area 802 associated with the highlights, a second area 804 associated with the midtones, and a third area 806 associated with the shadows.

Figure 9:
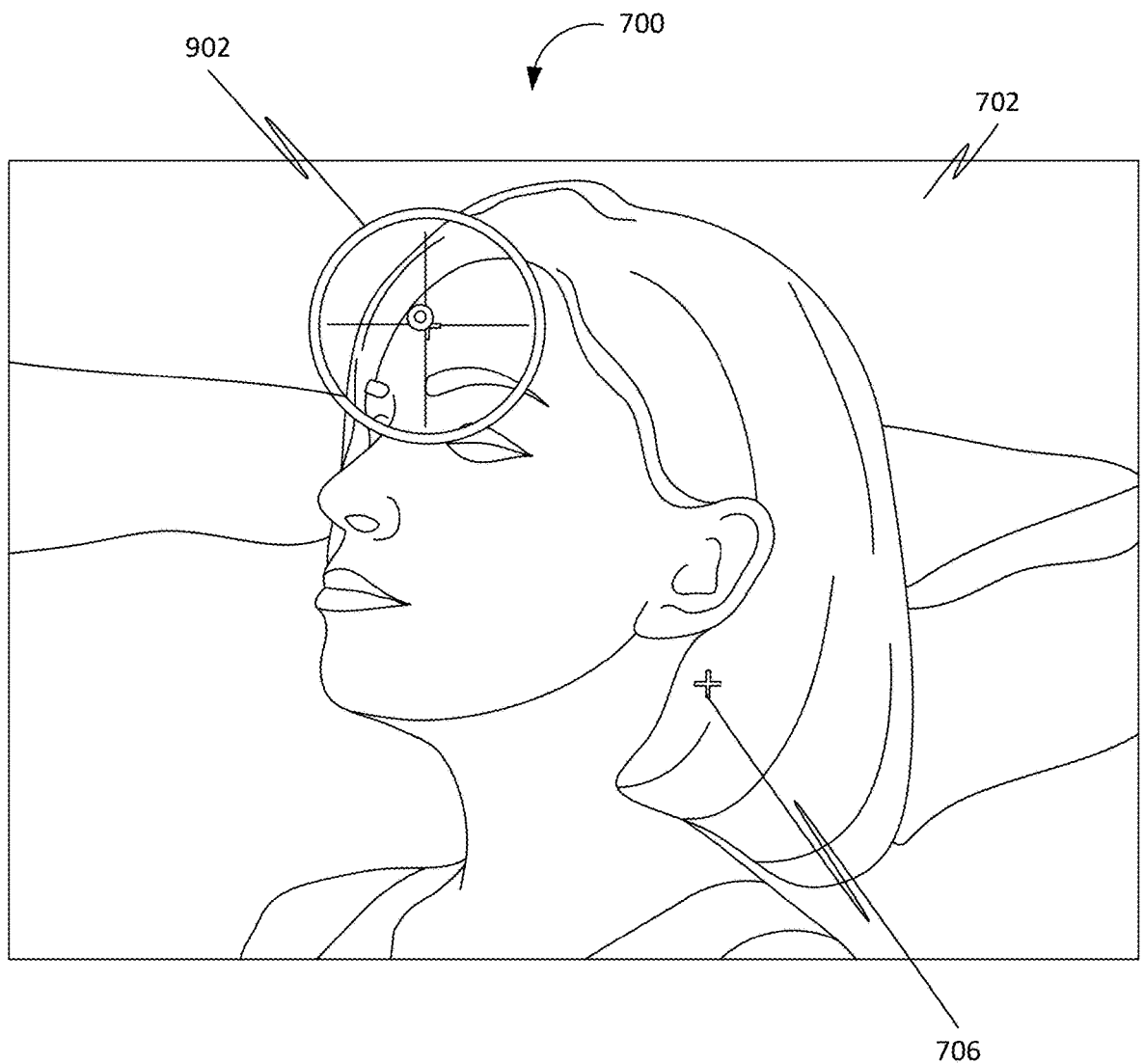
FIG. 9 illustrates the user interface 700 for facilitating the editing of the images, in accordance with some embodiments.

FIG. 9 illustrates the user interface 700 for facilitating the editing of the images, in accordance with some embodiments. Further, the user interface 700 displays a color wheel 902 on the image 702 proximal to the area selected using the selection indication 704 based on the selection of the area using the selection indication 704.

Figure 10:
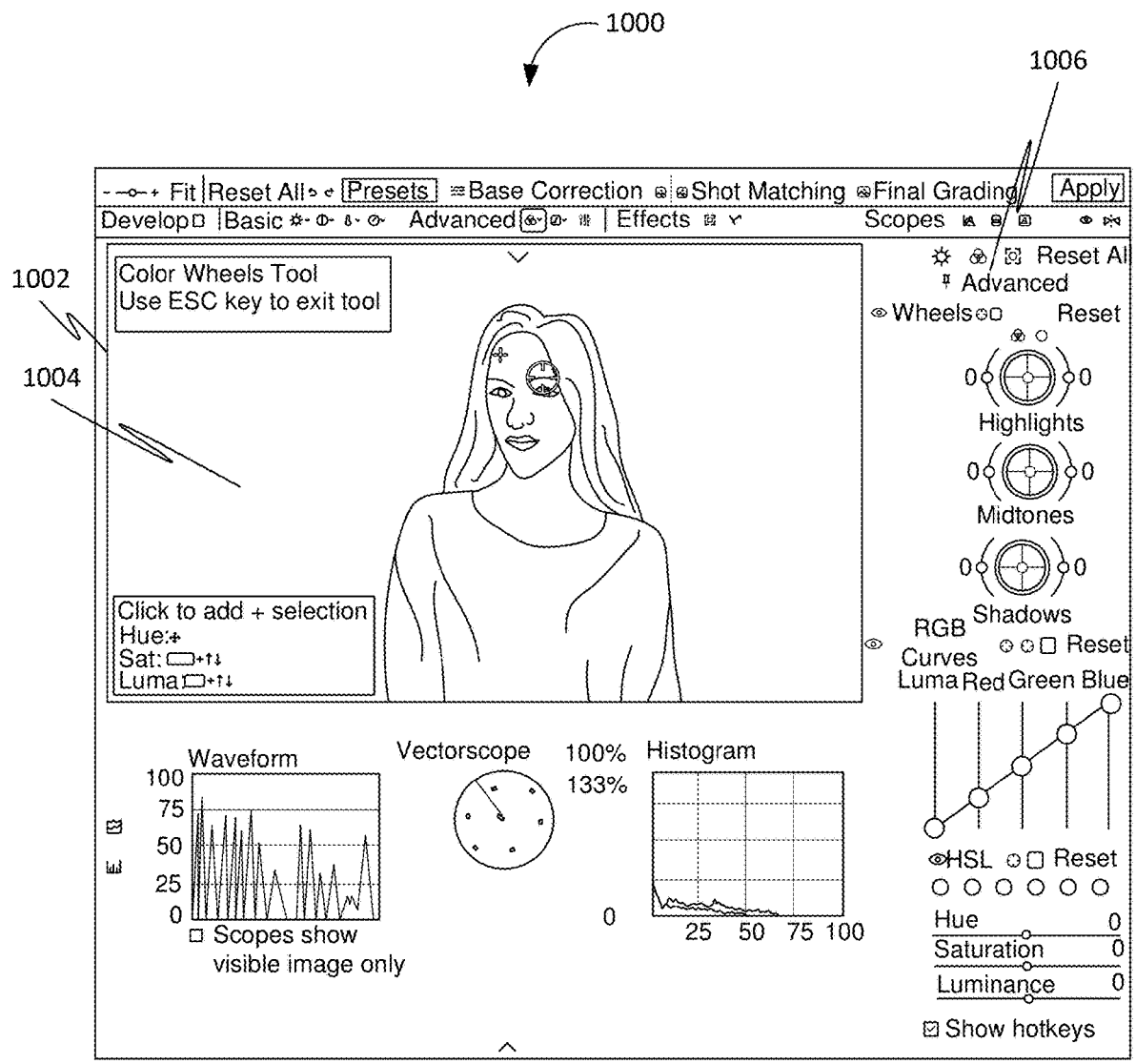
FIG. 10 illustrates a user interface 1000 for facilitating editing of images, in accordance with some embodiments.

FIG. 10 illustrates a user interface 1000 for facilitating editing of images, in accordance with some embodiments. Further, the user interface 1000 may include a display area 1002 for displaying an image 1004. Further, the user interface 1000 may include a tools area 1006 for displaying one or more tools. Further, the one or more tools may include wheels and RGB curves.

Figure 11:
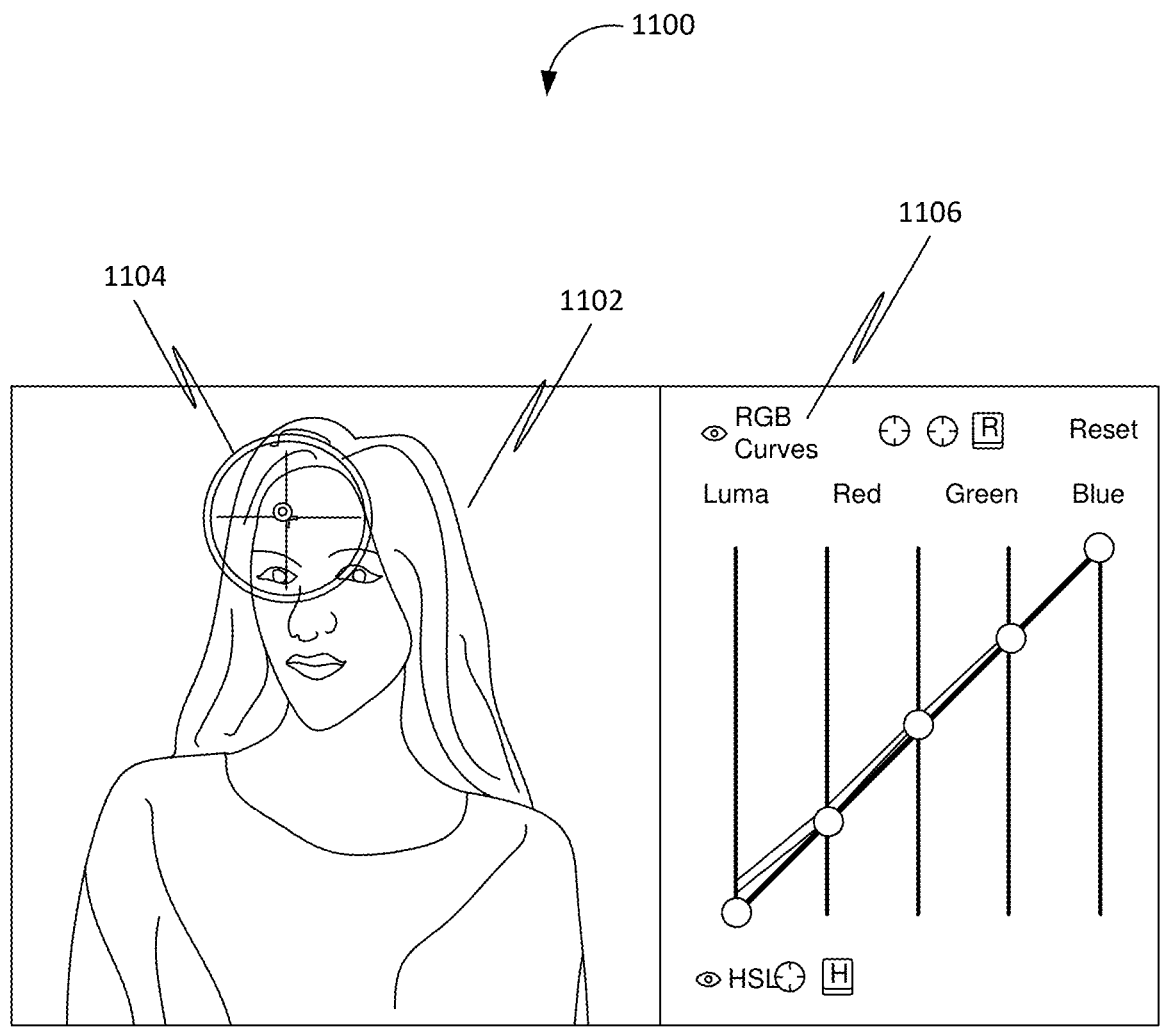
FIG. 11 illustrates a user interface 1100 for facilitating editing of images, in accordance with some embodiments.

FIG. 11 illustrates a user interface 1100 for facilitating editing of images, in accordance with some embodiments. Further, the user interface 1100 may display an image 1102, a wheel 1104 on the image 1102, and a RGB curves tool 1106. Further, the RGB curves tool 1106 may include five fixed points corresponding to shadows, undertones, midtones, overtones, and highlights on curves.

Figure 12A:
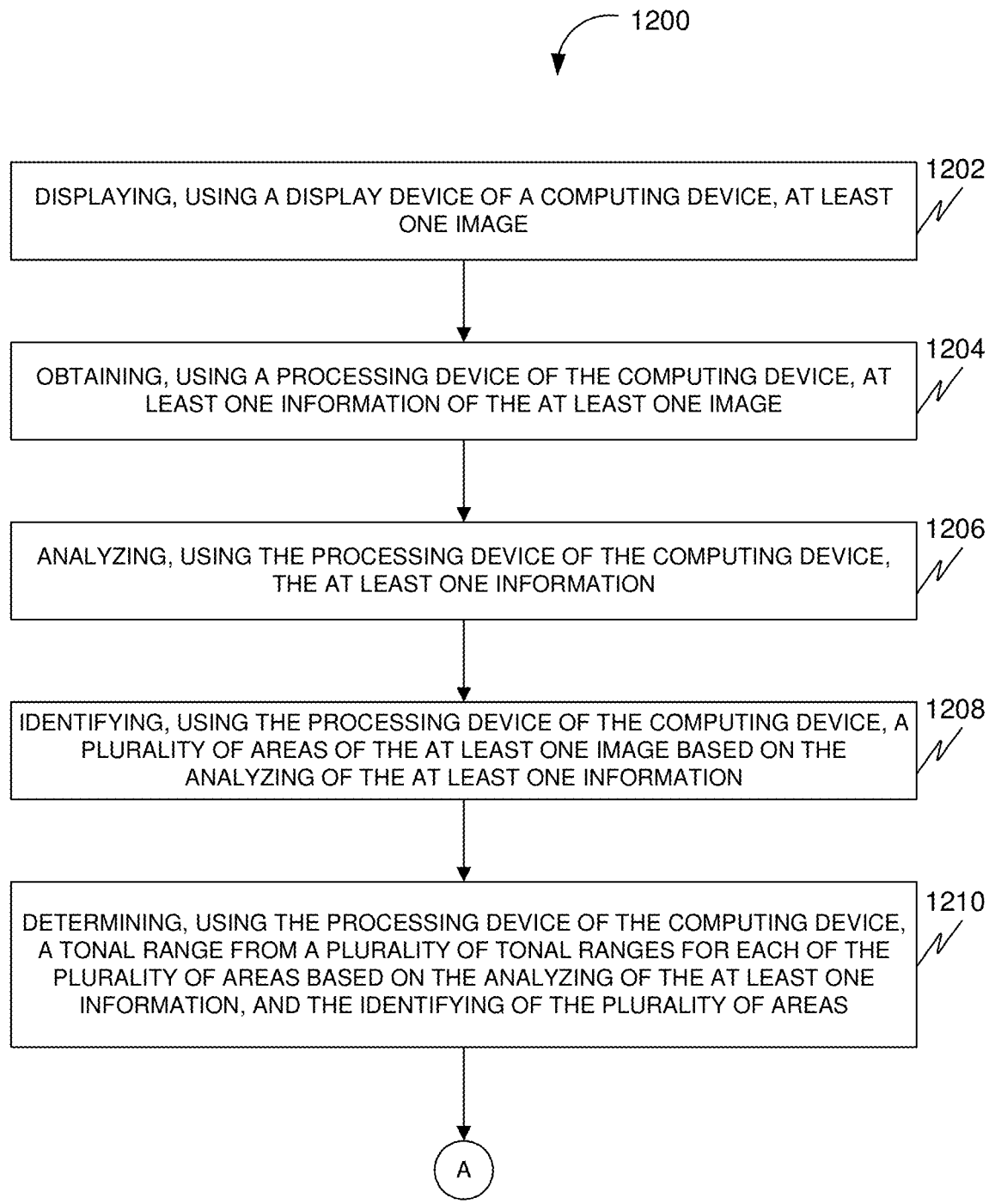
FIG. 12A illustrates a flowchart of a method 1200 for facilitating editing of images using image editing tools, in accordance with some embodiments.
Figure 12B:
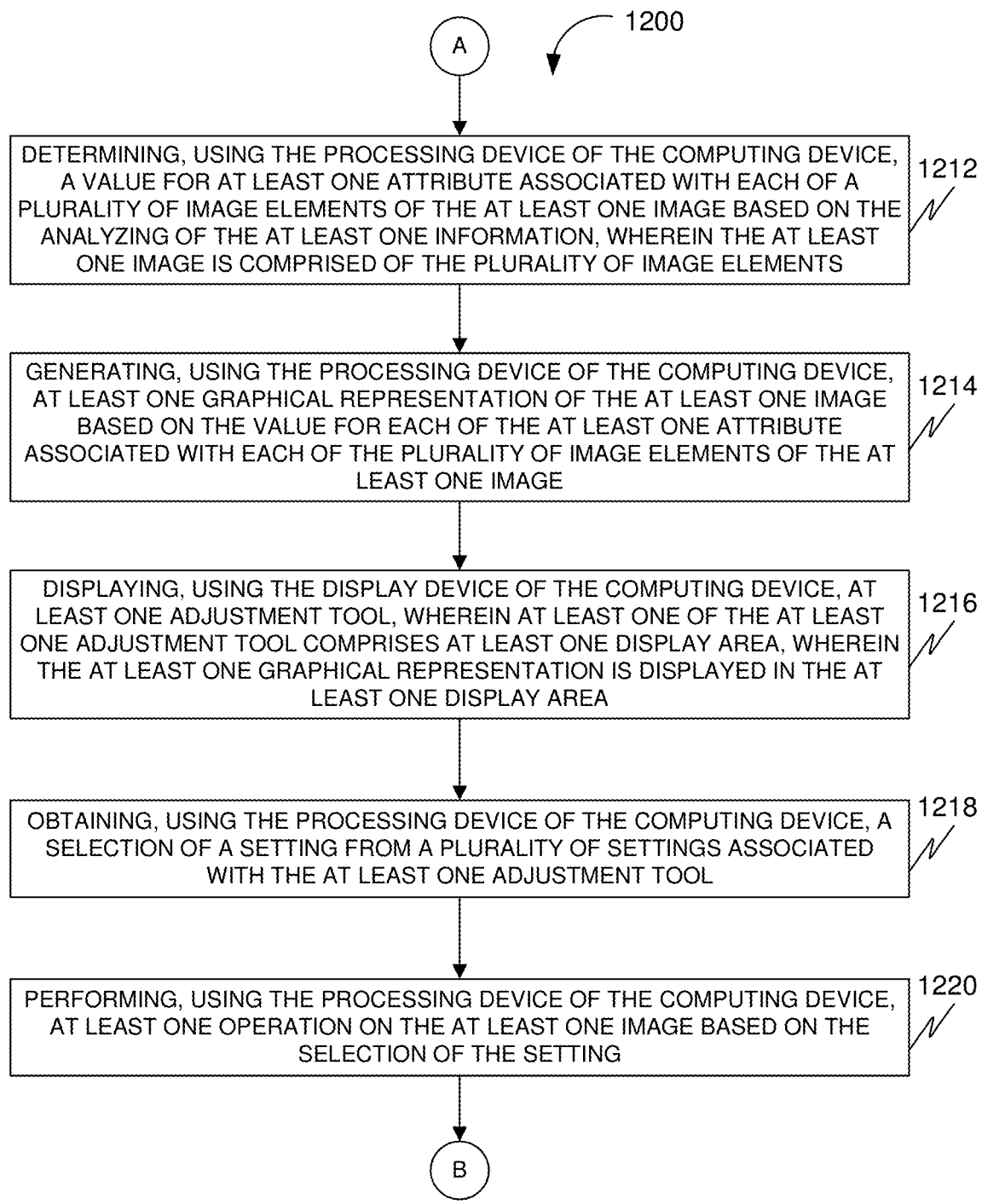
FIG. 12B illustrates a continuation of the flowchart of the method 1200 for facilitating editing of images using image editing tools, in accordance with some embodiments.
Figure 12C:
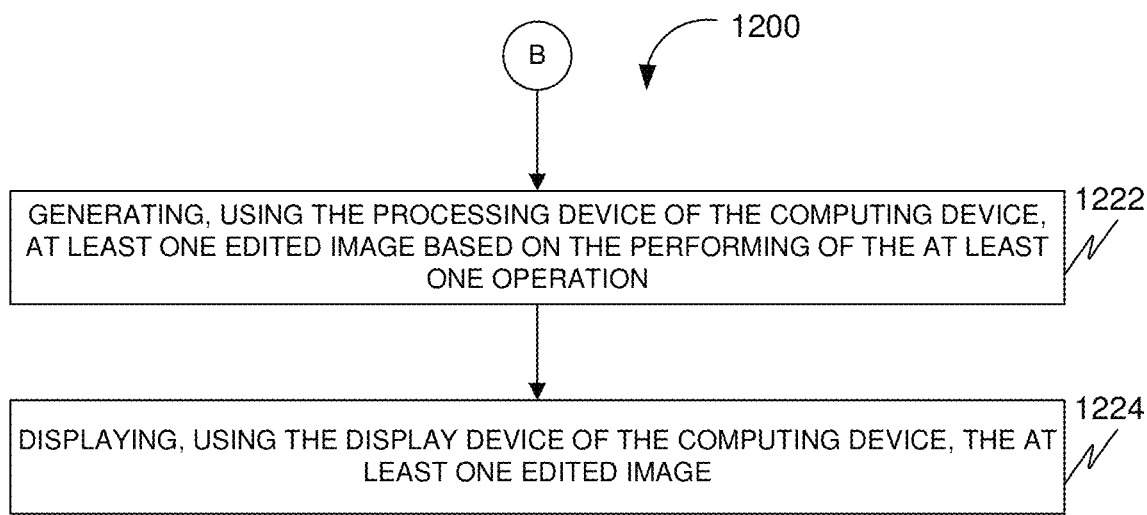
FIG. 12C illustrates a continuation of the flowchart of the method 1200 for facilitating editing of images using image editing tools, in accordance with some embodiments.

FIG. 12A, FIG. 12B, and FIG. 12C illustrate a flowchart of a method 1200 for facilitating editing of images using image editing tools, in accordance with some embodiments.

Accordingly, the method 1200 may include a step 1202 of displaying one or more, using a display device of a computing device, images. Further, the method 1200 may include a step 1204 of obtaining, using a processing device of the computing device, one or more information of the one or more images. Further, the method 1200 may include a step 1206 of analyzing, using the processing device of the computing device, the one or more information. Further, the method 1200 may include a step 1208 of identifying, using the processing device of the computing device, two or more areas of the one or more images based on the analyzing of the one or more information. Further, the method 1200 may include a step 1210 of determining, using the processing device of the computing device, a tonal range from two or more tonal ranges for each of the two or more areas based on the analyzing of the one or more information, and the identifying of the two or more areas. Further, the two or more tonal ranges may include two or more tone ranges. Further, the method 1200 may include a step 1212 of determining, using the processing device of the computing device, a value for one or more attributes associated with each of two or more image elements of the one or more images based on the analyzing of the one or more information. Further, the one or more attributes may include a luma component, a chroma component, etc. Further, the one or more attributes may include an intensity and a color. Further, the one or more attributes may include color, hue, saturation, chroma, lightness, brightness, texture, etc. Further, the one or more attributes may include luminance, hue, saturation, etc. Further, the one or more images may be comprised of the two or more image elements. Further, the method 1200 may include a step 1214 of generating, using the processing device of the computing device, one or more graphical representations of the one or more images based on the value for each of the one or more attributes associated with each of the two or more image elements of the one or more images. Further, the one or more graphical representations may include graphs. Further, the one or more graphical representations may include waveforms, traces, curves, etc. Further, the one or more graphical representations represent the value of each of the one or more attributes of each of the two or more image elements. Further, the one or more graphical representations may include statistical representations of the one or more images. Further, the method 1200 may include a step 1216 of displaying, using the display device of the computing device, one or more adjustment tools. Further, one or more of the one or more adjustment tools include one or more display areas. Further, the one or more adjustment tools may include one or more image editing tools (i.e., video scopes). Further, the one or more adjustment tools may include an on-screen color wheel (i.e. wheel), a RGB curves tool (i.e. 5-way color tool), etc. Further, the one or more adjustment tools may be interactive. Further, one or more interactions with the one or more adjustment tools corresponds to one or more setting of the two or more settings. Further, the one or more adjustment tools may include video scopes. Further, the one or more graphical representations may be displayed in the one or more display areas. Further, the method 1200 may include a step 1218 of obtaining, using the processing device of the computing device, a selection of a setting from two or more settings associated with the one or more adjustment tools. Further, the obtaining of the selection of the setting may be further based on either one of an image interaction with the one or more images and an adjustment tool interaction with the one or more adjustment tools. Further, the image interaction may include a clicking on the one or more images. Further, the one or more adjustment tools may be displayed over the one or more images based on the image interaction. Further, the image interaction may be associated with a location on the one or more images. Further, the one or more adjustment tools may be displayed on the one or more images proximal to the location on the one or more images. Further, the displaying of the one or more adjustment tools may include overlaying the one or more adjustment tools on the one or more images proximal to the location. Further, the image interaction further includes a selection of an area of the one or more images, an input corresponding to the setting using the one or more adjustment tools displayed on the one or more images based on the selection of the area. Further, the input may include a directional input on the one or more images. Further, the directional input corresponds to a dragging of an indicator appears on the area based on the selection of the area from a first location to a second location on the image. Further, the directional input translates to the setting of the two or more settings of the one or more adjustment tools. Further, the adjustment tool interaction may include a clicking on the one or more adjustment tools. Further, the image interaction and the adjustment tool interaction may be received using an input device of the computing device. Further, the obtaining of the selection of the setting may include obtaining the selection of the setting through the one or more adjustment tools. Further, the obtaining of the selection of the setting through the one or more adjustment tools may be based on at least one modification of the one or more graphical representations displayed in the one or more adjustment tools through at least one interaction with the one or more graphical representations. Further, the obtaining of the selection of the setting may be based on at least one interaction with the one or more adjustment tools. Further, the at least one interaction may include clicking, clicking and dragging, etc. Further, the at least one interaction may include at least one modification to the one or more graphical representations. Further, the method 1200 may include a step 1220 of performing, using the processing device of the computing device, one or more operations on the one or more images based on the selection of the setting. Further, the one or more operations may include an adjustment made in relation to one or more of the two or more tonal ranges. Further, the adjustment may be made to one or more of the two or more areas that correspond to one or more of the two or more tonal ranges. Further, the adjustment may include a luminance adjustment, a saturation adjustment, a hue adjustment, etc. Further, the luminance adjustment may include an adjustment in a luminance value of one or more image elements associated with a tonal range, the saturation adjustment may include an adjustment in a saturation value of one or more image elements associated with a tonal range, and the hue adjustment may include an adjustment in a hue value of one or more image elements associated with a tonal range. Further, the adjustment may include change, modification, alteration, correction, etc. Further, the method 1200 may include a step 1222 of generating, using the processing device of the computing device, one or more edited images based on the performing of the one or more operations. Further, the method 1200 may include a step 1224 of displaying, using the display device of the computing device, the one or more edited images.

In some embodiments, the one or more graphical representations include a waveform representation. Further, the waveform representation may include traces, waveforms, curves, etc. Further, the waveform representation represents a distribution of one or more of a luminance value and a chrominance value of one or more image elements present at each of two or more horizontal locations of the one or more images. Further, the luminance value corresponds to a luminance, and a chrominance value corresponds to a chrominance. Further, the chrominance value may include a hue value corresponding to a hue, and a saturation value corresponding to a saturation. Further, the distribution of one or more of the luminance value and the chrominance value of the two or more image elements may be represented using a two-dimensional Cartesian graph. Further, each of two or more horizontal positions within the waveform representation corresponds to a respective one of the two or more horizontal locations of the one or more images. Further, each of two or more vertical positions within the waveform representation corresponds to a magnitude associated with one or more of the luminance value and the chrominance value. Further, the one or more adjustment tools include a waveform scope. Further, the one or more display areas include a waveform display area. Further, the waveform display area may include two-dimensional Cartesian surface. Further, the waveform representation may be displayed in the waveform display area. Further, the chrominance value may include a color shade and a color intensity. Further, the luminance value may include a brightness value.

In some embodiments, the one or more graphical representations include two or more waveform representations. Further, each of the two or more waveform representations represents a distribution of a color component value of one or more image elements present at each of two or more horizontal locations of the one or more images. Further, the color component value corresponds to a color channel of two or more color channels. Further, the two or more color channels may include a red channel, a blue channel, and a green channel. Further, the two or more waveform representations may be spatially segregated. Further, each of two or more horizontal positions within each of the two or more waveform representations corresponds to a respective one of the two or more horizontal locations of the one or more images. Further, each of two or more vertical positions within each of the two or more waveform representations corresponds to a respective magnitude associated with a corresponding one of the two or more color component values. Further, the one or more adjustment tools include a parade waveform scope. Further, the one or more display areas include a waveform display area. Further, the two or more waveform representations may be displayed in the waveform display area. Further, the two or more waveform representations may be sequentially displayed in the waveform display.

In some embodiments, the one or more graphical representations include a vectorscope representation. Further, the vectorscope representation represents a distribution of a chrominance value (i.e., chroma component) of the two or more image elements in the one or more images. Further, the distribution of the chrominance value of the two or more image elements may be represented using a two-dimensional polar graph. Further, the vectorscope representation represents a distribution of a luminance value of the two or more image elements in the one or more images. Further, each of two or more angular positions within the vectorscope representation corresponds to a respective hue value associated with one or more image elements of the one or more images. Further, each of two or more radial positions within the vectorscope representation corresponds to a respective saturation value associated with the one or more image elements. Further, the chrominance value includes a hue value and a saturation value. Further, the one or more adjustment tools include a vector scope. Further, the one or more display areas include a vectorscope display area. Further, the vector scope display area may be a two dimensional polar surface. Further, the vectorscope representation may be displayed in the vectorscope display area.

In some embodiments, the one or more graphical representations include two or more histogram representations. Further, each of the two or more histogram representations represents a distribution of a color value for the two or more image elements across the one or more images. Further, one of the two or more histogram representations represents a distribution of a luminance value for the two or more image elements across the one or more images. Further, the color value corresponds to a color channel of two or more color channels. Further, the one or more adjustment tools include a histogram scope. Further, the one or more display areas include a histogram display area. Further, the two or more histogram representations may be displayed in the histogram display area.

Figure 13:
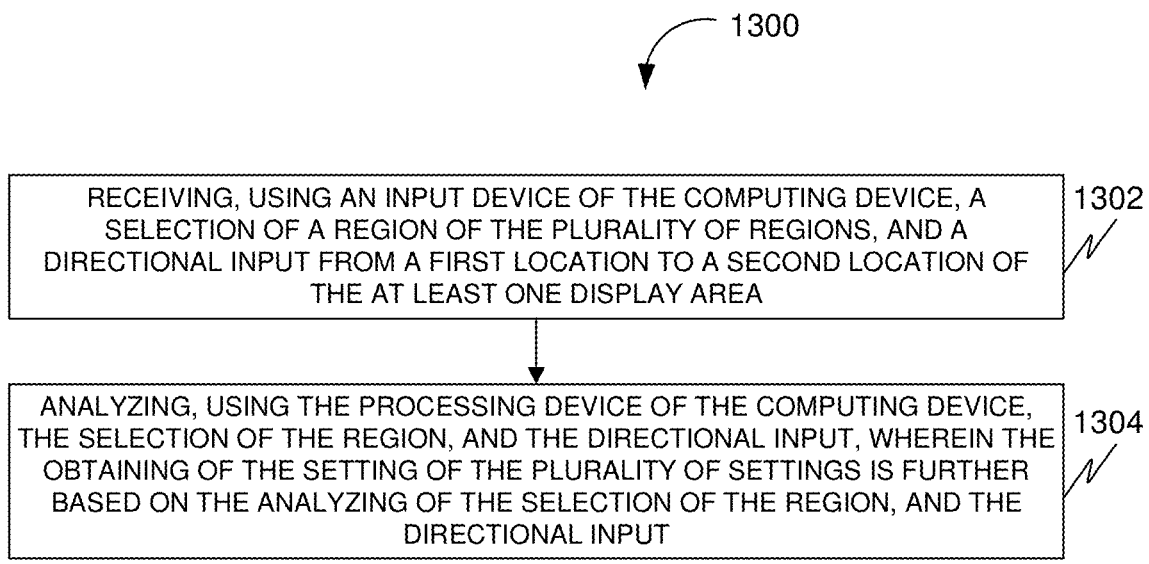
FIG. 13 illustrates a flowchart of a method 1300 for facilitating editing of images using image editing tools including analyzing the selection of the region, and the directional input, in accordance with some embodiments.

FIG. 13 illustrates a flowchart of a method 1300 for facilitating editing of images using image editing tools including analyzing the selection of the region, and the directional input, in accordance with some embodiments.

Further, in some embodiments, the one or more graphical representations may be associated with two or more regions of the one or more display areas. Further, each one of the two or more regions corresponds to a respective one of the two or more tonal ranges. Further, the method 1300 further may include a step 1302 of receiving, using an input device of the computing device, a selection of a region of the two or more regions, and a directional input from a first location to a second location of the one or more display areas. Further, the one or more graphical representations may be associated with two or more regions of the one or more display areas. Further, the method 1300 further may include a step 1304 of analyzing, using the processing device of the computing device, the selection of the region, and the directional input. Further, the obtaining of the setting of the two or more settings may be further based on the analyzing of the selection of the region, and the directional input. Further, the setting may correspond to a value of at least one of a luminance, a hue, and a saturation of one or more areas of the one or more images corresponding to the tonal range. Further, the one or more areas may have the tonal range. Further, the at least one operation may include modifying a previous value of at least one of the luminance, the hue, and the saturation to the value of at least one of the luminance, the hue, and the saturation based on the value of at least one of the luminance, the hue, and the saturation. Further, the generating of the one or more edited images may be based on the modifying.

Figure 14:
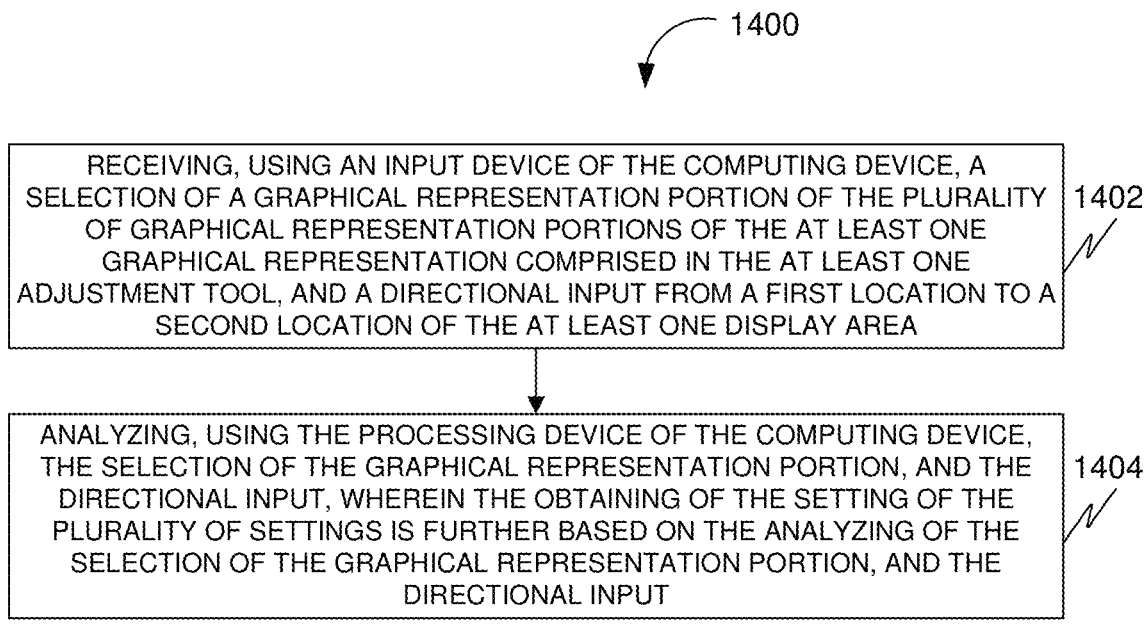
FIG. 14 illustrates a flowchart of a method 1400 for facilitating editing of images using image editing tools including analyzing the selection of the graphical representation portion, and the directional input, in accordance with some embodiments.

FIG. 14 illustrates a flowchart of a method 1400 for facilitating editing of images using image editing tools including analyzing the selection of the graphical representation portion, and the directional input, in accordance with some embodiments.

Further, in some embodiments, the one or more graphical representations may include two or more graphical representation portions. Further, each of the two or more graphical representation portions corresponds to a respective one of the two or more tonal ranges. Further, the method 1400 further may include a step 1402 of receiving, using an input device of the computing device, a selection of a graphical representation portion of the two or more graphical representation portions of the one or more graphical representations comprised in the one or more adjustment tools, and a directional input from a first location to a second location of the one or more display areas. Further, the one or more graphical representations may include two or more graphical representation portions. Further, the method 1400 further may include a step 1404 of analyzing, using the processing device of the computing device, the selection of the graphical representation portion, and the directional input. Further, the obtaining of the setting of the two or more settings may be further based on the analyzing of the selection of the graphical representation portion, and the directional input. Further, the setting may correspond to a value of at least one of a luminance, a hue, and a saturation of one or more areas of the one or more images corresponding to the tonal range. Further, the one or more areas may have the tonal range. Further, the at least one operation may include modifying a previous value of at least one of the luminance, the hue, and the saturation to the value of at least one of the luminance, the hue, and the saturation based on the value of at least one of the luminance, the hue, and the saturation. Further, the generating of the one or more edited images may be based on the modifying.

Figure 15:
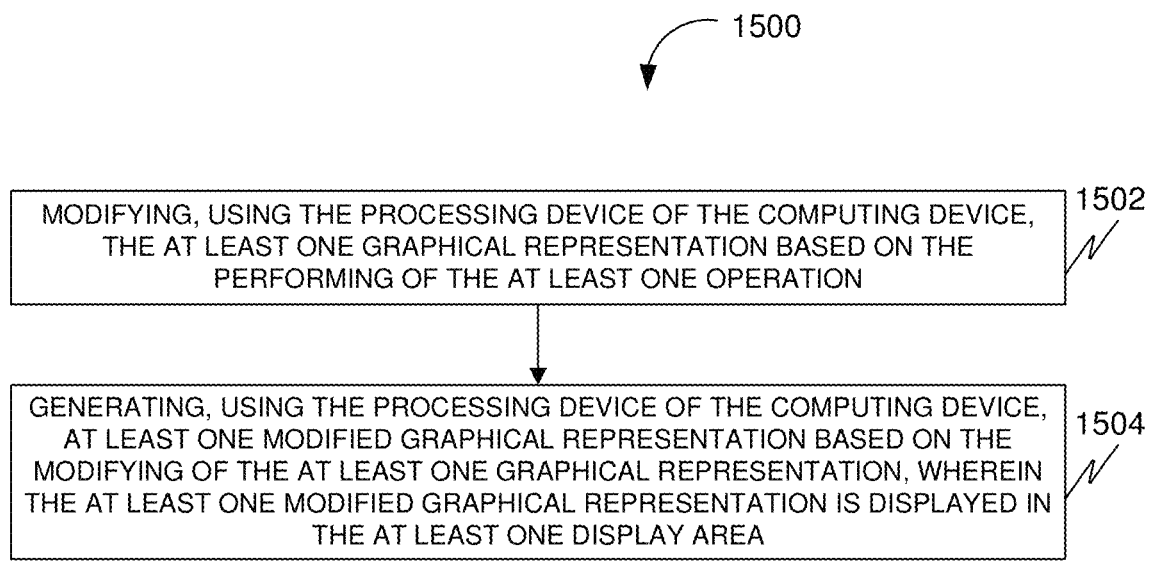
FIG. 15 illustrates a flowchart of a method 1500 for facilitating editing of images using image editing tools including generating at least one modified graphical representation, in accordance with some embodiments.

FIG. 15 illustrates a flowchart of a method 1500 for facilitating editing of images using image editing tools including generating at least one modified graphical representation, in accordance with some embodiments.

Further, in some embodiments, the method 1500 further may include a step 1502 of modifying, using the processing device of the computing device, the one or more graphical representations based on the performing of the one or more operations. Further, in some embodiments, the method 1500 further may include a step 1504 of generating, using the processing device of the computing device, one or more modified graphical representations based on the modifying of the one or more graphical representations. Further, the one or more modified graphical representations may be displayed in the one or more display areas.

Further, in an embodiment, the method 1500 may include analyzing, using the processing device of the computing device, the one or more modified graphical representations. Further, the method 1500 may include determining, using the processing device of the computing device, the setting based on the analyzing of the one or more modified graphical representations. Further, the obtaining of the selection of the setting may be based on the determining of the setting.

Figure 16:
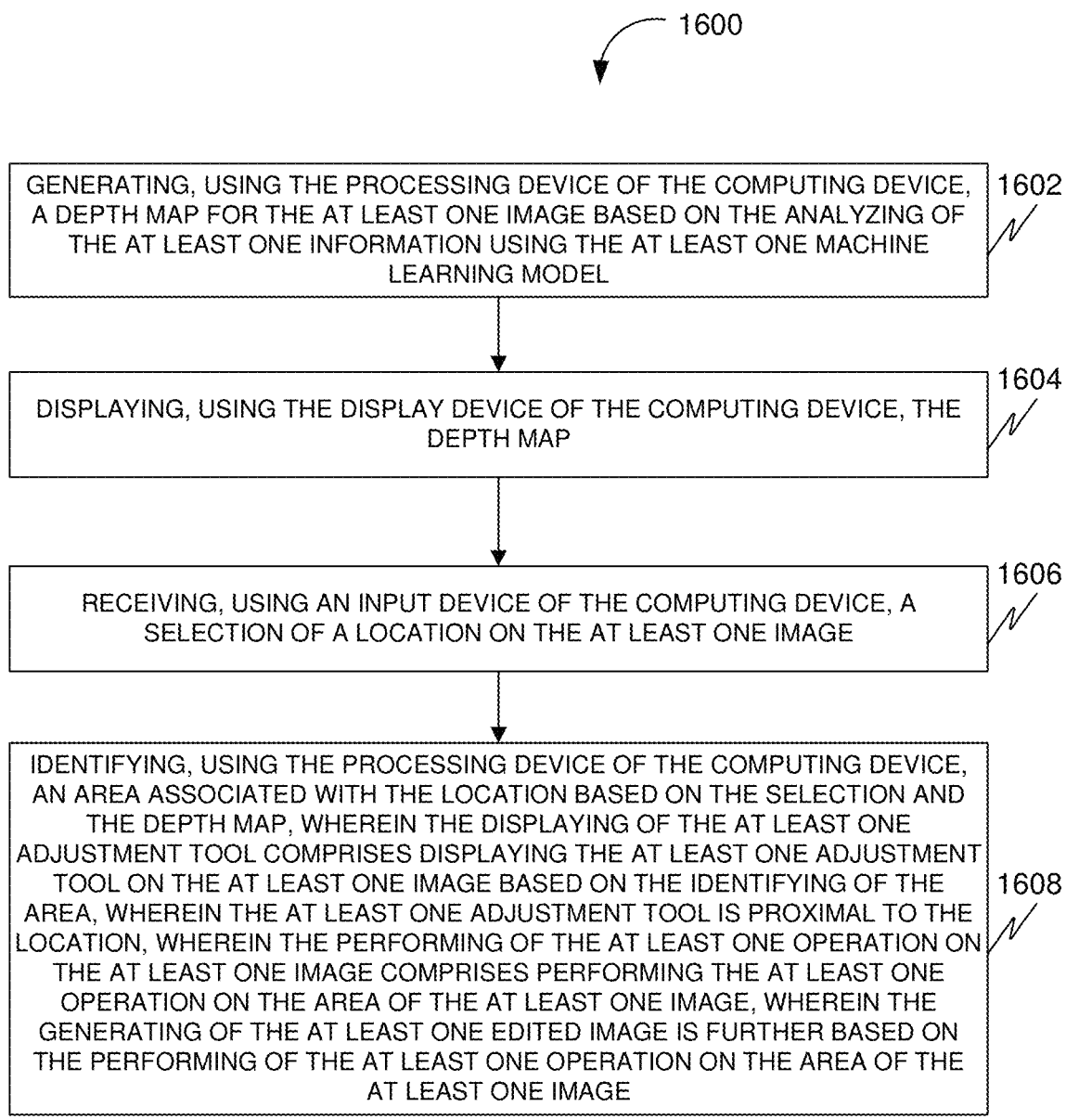
FIG. 16 illustrates a flowchart of a method 1600 for facilitating editing of images using image editing tools including identifying an area associated with the location, in accordance with some embodiments.

FIG. 16 illustrates a flowchart of a method 1600 for facilitating editing of images using image editing tools including identifying an area associated with the location, in accordance with some embodiments.

Further, in some embodiments, the analyzing of the one or more information may include analyzing the one or more information using one or more machine learning models. Further, the method 1600 further may include a step 1602 of generating, using the processing device of the computing device, a depth map for the one or more images based on the analyzing of the one or more information using the one or more machine learning models. Further, the method 1600 further may include a step 1604 of displaying, using the processing device of the computing device, the depth map. Further, the method 1600 further may include a step 1606 of receiving, using an input device of the computing device, a selection of a location on the one or more images. Further, the method 1600 further may include a step 1608 of identifying, using the processing device of the computing device, an area associated with the location based on the selection and the depth map. Further, the area may be of the one or more images. Further, the area may be an image area of the one or more images. Further, the displaying of the one or more adjustment tools includes displaying the one or more adjustment tools on the one or more images based on the identifying of the area. Further, the one or more adjustment tools may be proximal to the location. Further, the performing of the one or more operations on the one or more images includes performing the one or more operations on the area of the one or more images. Further, the generating of the one or more edited images may be further based on the performing of the one or more operations on the area of the one or more images.

Further, in an embodiment, the method 1600 may include extracting, using the processing device of the computing device, a plurality of features from the one or more images using a feature extraction model of the one or more machine learning models based on the analyzing of the one or more information using the one or more machine learning models. Further, the plurality of features may include hierarchical features. Further, the method 1600 may include processing, using the processing device of the computing device, the plurality of features. Further, the method 1600 may include predicting, using the processing device of the computing device, a respective depth value for each of the two or more image elements using a depth estimation model of the one or more machine learning models based on the processing. Further, the method 1600 may include mapping, using the processing device of the computing device, the depth value to a location of each of the two or more image elements in the one or more images based on the depth value. Further, the generating of the depth map may be based on the mapping. Further, the method 1600 may include determining, using the processing device of the computing device, a first depth value of one or more first image elements corresponding to the location based on the selection of the location. Further, the method 1600 may include identifying, using the processing device of the computing device, one or more second image elements associated with the first depth value based on the determining of the first depth value. Further, the identifying of the area may be based on the identifying of the one or more second image elements. Further, the area may be comprised of the one or more second image elements.

According to some embodiments, the system 600 facilitates editing of images using image editing tools. Further, the system 600 may include the display device 602. Further, the display device 602 may be configured for displaying one or more images. Further, the display device 602 may be configured for displaying one or more adjustment tools. Further, one or more of the one or more adjustment tools includes one or more display areas. Further, one or more graphical representations may be displayed in the one or more display areas. Further, the display device 602 may be configured for displaying one or more edited images. Further, the system 600 may include a processing device 606 communicatively coupled with the display device 602. Further, the processing device 606 may be configured for obtaining one or more information of the one or more images. Further, the processing device 606 may be configured for analyzing the one or more information. Further, the processing device 606 may be configured for identifying two or more areas of the one or more images based on the analyzing of the one or more information. Further, the processing device 606 may be configured for determining a tonal range from two or more tonal ranges for each of the two or more areas based on the analyzing of the one or more information, and the identifying of the two or more areas. Further, the processing device 606 may be configured for determining a value for one or more attributes associated with each of two or more image elements of the one or more images based on the analyzing of the one or more information. Further, the one or more images may be comprised of the two or more image elements. Further, the processing device 606 may be configured for generating the one or more graphical representations of the one or more images based on the value for each of the one or more attributes associated with each of the two or more image elements of the one or more images. Further, the processing device 606 may be configured for obtaining a selection of a setting from two or more settings associated with the one or more adjustment tools. Further, the obtaining of the selection of the setting may be further based on either one of an image interaction with the one or more images and an adjustment tool interaction with the one or more adjustment tools. Further, the processing device 606 may be configured for performing one or more operations on the one or more images based on the selection of the setting. Further, the one or more operations may include an adjustment made in relation to one or more of the two or more tonal ranges. Further, the processing device 606 may be configured for generating the one or more edited images based on the performing of the one or more operations.

Further, in some embodiments, the analyzing of the one or more information may include analyzing the one or more information using one or more machine learning models. Further, the processing device 606 may be further configured for generating a depth map for the one or more images based on the analyzing of the one or more information using the one or more machine learning models. Further, the processing device 606 may be further configured for identifying an area associated with a location based on a selection and the depth map. Further, the displaying of the one or more adjustment tools includes displaying the one or more adjustment tools on the one or more images based on the identifying of the area. Further, the one or more adjustment tools may be proximal to the location. Further, the performing of the one or more operations on the one or more images includes performing the one or more operations on the area of the one or more images. Further, the generating of the one or more edited images may be further based on the performing of the one or more operations on the area of the one or more images. Further, the display device 602 may be further configured for displaying the depth map. Further, the system 600 further includes an input device 604 communicatively coupled with the processing device 606. Further, the input device 604 may be configured for receiving the selection of the location on the one or more images.

Accordingly, the non-transitory computer-readable medium storing one or more instructions that when executed by a processing device of a computing device, configure the computing device to perform a method for facilitating editing of images using image editing tools. Further, the method may include displaying one or more images. Further, the method may include obtaining one or more information of the one or more images. Further, the method may include analyzing the one or more information. Further, the method may include identifying two or more areas of the one or more images based on the analyzing of the one or more information. Further, the method may include determining a tonal range from two or more tonal ranges for each of the two or more areas based on the analyzing of the one or more information, and the identifying of the two or more areas. Further, the method may include determining a value for one or more attributes associated with each of two or more image elements of the one or more images based on the analyzing of the one or more information. Further, the one or more images may be comprised of the two or more image elements. Further, the method may include generating one or more graphical representations of the one or more images based on the value for each of the one or more attributes associated with each of the two or more image elements of the one or more images. Further, the method may include displaying one or more adjustment tools. Further, one or more of the one or more adjustment tools include one or more display areas. Further, the one or more graphical representations may be displayed in the one or more display areas. Further, the method may include obtaining a selection of a setting from two or more settings associated with the one or more adjustment tools. Further, the obtaining of the selection of the setting may be further based on either one of an image interaction with the one or more images and an adjustment tool interaction with the one or more adjustment tools. Further, the method may include performing one or more operations on the one or more images based on the selection of the setting. Further, the one or more operations may include an adjustment made in relation to one or more of the two or more tonal ranges. Further, the method may include generating one or more edited images based on the performing of the one or more operations. Further, the method may include displaying the one or more edited images.

In some embodiments, the one or more graphical representations include a waveform representation. Further, the waveform representation represents a distribution of one or more of a luminance value and a chrominance value of one or more image elements present at each of two or more horizontal locations of the one or more images. Further, each of two or more horizontal positions within the waveform representation corresponds to a respective one of the two or more horizontal locations of the one or more images. Further, each of two or more vertical positions within the waveform representation corresponds to a magnitude associated with one or more of the luminance value and the chrominance value. Further, the one or more adjustment tools include a waveform scope. Further, the one or more display areas include a waveform display area. Further, the waveform representation may be displayed in the waveform display area.

In some embodiments, the one or more graphical representations include two or more waveform representations. Further, each of the two or more waveform representations represents a distribution of a color component value of one or more image elements present at each of two or more horizontal locations of the one or more images. Further, the color component value corresponds to a color channel of two or more color channels. Further, the two or more waveform representations may be spatially segregated. Further, each of two or more horizontal positions within each of the two or more waveform representations corresponds to a respective one of the two or more horizontal locations of the one or more images. Further, each of two or more vertical positions within each of the two or more waveform representations corresponds to a respective magnitude associated with a corresponding one of the two or more color component values. Further, the one or more adjustment tools include a parade waveform scope. Further, the one or more display areas include a waveform display area. Further, the two or more waveform representations may be displayed in the waveform display area.

In some embodiments, the one or more graphical representations include a vectorscope representation. Further, the vectorscope representation represents a distribution of a chrominance value of the two or more image elements in the one or more images. Further, each of two or more angular positions within the vectorscope representation corresponds to a respective hue value associated with one or more image elements of the one or more images. Further, each of two or more radial positions within the vectorscope representation corresponds to a respective saturation value associated with the one or more image elements. Further, the chrominance value includes a hue value and a saturation value. Further, the one or more adjustment tools include a vector scope. Further, the one or more display areas include a vectorscope display area. Further, the vectorscope representation may be displayed in the vectorscope display area.

In some embodiments, the one or more graphical representations include two or more histogram representations. Further, each of the two or more histogram representations represents a distribution of a color value for the two or more image elements across the one or more images. Further, the color value corresponds to a color channel of two or more color channels. Further, the one or more adjustment tools include a histogram scope. Further, the one or more display areas include a histogram display area. Further, the two or more histogram representations may be displayed in the histogram display area.

Further, in some embodiments, the one or more graphical representations may be associated with two or more regions of the one or more display areas. Further, each one of the two or more regions corresponds to a respective one of the two or more tonal ranges. Further, the method further may include receiving a selection of a region of the two or more regions, and a directional input from a first location to a second location of the one or more display areas. Further, the method further may include analyzing the selection of the region, and the directional input. Further, the obtaining of the setting of the two or more settings may be further based on the analyzing of the selection of the region, and the directional input.

Further, in some embodiments, the one or more graphical representations may include two or more graphical representation portions. Further, each of the two or more graphical representation portions corresponds to a respective one of the two or more tonal ranges. Further, the method further may include receiving a selection of a graphical representation portion of the two or more graphical representation portions of the one or more graphical representations comprised in the one or more adjustment tools, and a directional input from a first location to a second location of the one or more display areas. Further, the one or more graphical representations may include two or more graphical representation portions. Further, the method further may include analyzing the selection of the graphical representation portion, and the directional input. Further, the obtaining of the setting of the two or more settings may be further based on the analyzing of the selection of the graphical representation portion, and the directional input.

Further, in some embodiments, the method further may include modifying the one or more graphical representations based on the performing of the one or more operations. Further, the method further may include generating one or more modified graphical representations based on the modifying of the one or more graphical representations. Further, the one or more modified graphical representations may be displayed in the one or more display areas.

Further, in some embodiments, the analyzing of the one or more information may include analyzing the one or more information using one or more machine learning models. Further, the method further may include generating a depth map for the one or more images based on the analyzing of the one or more information using the one or more machine learning models. Further, the method further may include displaying the depth map. Further, the method further may include receiving a selection of a location on the one or more images. Further, the method further may include identifying an area associated with the location based on the selection and the depth map. Further, the displaying of the one or more adjustment tools includes displaying the one or more adjustment tools on the one or more images based on the identifying of the area. Further, the one or more adjustment tools may be proximal to the location. Further, the performing of the one or more operations on the one or more images includes performing the one or more operations on the area of the one or more images. Further, the generating of the one or more edited images may be further based on the performing of the one or more operations on the area of the one or more images.

In some embodiments, the one or more images include two or more images.

In some embodiments, the one or more images may include 2D images, 3D images, etc. Further, the 2D images may be comprised of pixels. Further, the 3D images may be comprised of voxels.

In some embodiments, the two or more image elements include two or more pixels and two or more voxels.

In some embodiments, the two or more tonal ranges include one or more predefined tonal ranges and one or more user defined tonal ranges. Further, the one or more predefined tonal ranges include shadows, midtones, and highlights. Further, one or more user defined tonal ranges include undertones and overtones. Further, the shadows correspond to a lowest brightness level range of two or more brightness level ranges of the one or more images, the highlights correspond to a highest brightness level range of the two or more brightness level ranges, and the midtones correspond to a middle brightness level range of the two or more brightness level ranges. Further, the middle brightness level range may be greater than the lowest brightness level range and less than the highest brightness level range. Further, the undertones may be associated with a first brightness level range of the two or more brightness level ranges and the overtones may be associated with a second brightness level range of the two or more brightness level ranges. Further, the first brightness level range may be greater than the lowest brightness level range and less than the middle brightness level range. Further, the second brightness level range may be greater than the middle brightness level range and less than the highest brightness level range. Further, in an embodiment, the method may include receiving an input. Further, the method may include determining the one or more user defined tonal ranges based on the input. Further, the receiving of the input may include receiving the input from the input device. Further, in an embodiment, the method may include determining of the one or more predefined tonal ranges based on the determining of the one or more user defined tonal ranges.

In some embodiments, the one or more images may be comprised of the two or more areas.

In some embodiments, the one or more adjustment tools include a wheel. Further, the wheel may include color wheel, 5-way color wheel, 5-color tool, on-screen color wheel, etc. Further, the wheel displays a spectrum of hues around a perimeter of the wheel. Further, the wheel displays an indicator at a center of the wheel. Further, the method further includes receiving a vector input from the wheel. Further, the vector input includes a vector from the center of the wheel towards a hue for a distance from the center. Further, the obtaining of the selection of the setting may be further based on the vector input.

In some embodiments, the one or more graphical representation corresponds to a coordinate framework representing one or more visual characteristics associated with one or more image elements comprised within the one or more images in relation to two or more spatial parameters associated with the coordinate framework. Further, the one or more graphical representations further include a data visualization structure which may be configured for representing a statistical relationship associated with the two or more image elements in relation to each of the plurality of spatial parameters. Further, the coordinate framework may be associated with a waveform scope, a parade waveform scope (i.e., RGB parade), etc.

In some embodiments, the coordinate framework includes a Cartesian coordinate framework. Further, the two or more spatial parameters associated with the Cartesian coordinate framework include an X-axis and a Y-axis. Further, the representing of the statistical relationship associated with the two or more image elements in relation to each of the plurality spatial parameters includes representing of the statistical relationship associated with the two or more image elements in relation to each of the X-axis and the Y-axis.

In some embodiments, the waveform representation may be associated with the Cartesian coordinate framework. Further, the data visualization structure in relation to the waveform distribution of one or more of a luminance value and a chrominance value of one or more image elements present at each of two or more horizontal locations of the one or more images. Further, the X-axis associated with the waveform representation represents the two or more horizontal locations of the one or more images. Further, the Y-axis associated with the waveform represents the magnitude associated with one or more of the luminance value and the chrominance value.

In some embodiments, each of the two or more waveform representations may be associated with the Cartesian coordinate framework. Further, the data visualization structure in relation to each of the two or more waveform representations represents the distribution of the color component value associated with each of a red color, a green color, and a blue color comprised in the one or more image elements present at each of two or more horizontal locations of the one or more images.

In some embodiments, the two or more waveform representations may include a plurality the histogram representations which may be associated with the Cartesian coordinate framework. Further, the data visualization structure in relation to the two or more histogram representations represents the distribution of the color value for the two or more image elements across the one or more images.

In some embodiments, the coordinate framework includes a Polar coordinate framework. Further, the two or more spatial parameters associated with the Polar coordinate framework include each of a radial parameter and an angular parameter. Further, the representing of the variable statistical relationship associated with the two or more image elements in relation to each of the plurality of spatial parameters includes representing the variable statistical relationship associated with the two or more image elements in relation to each of the radial parameter and the angular parameter. Further, the vectorscope representation of the image may be associated with the Polar coordinate framework. Further, the data visualization structure in relation to the vectorscope includes a chrominance cluster representing the distribution of the chrominance value of the two or more image elements in the one or more images. Further, the Polar coordinate framework may be associated with the vector scope.

Figure 17:
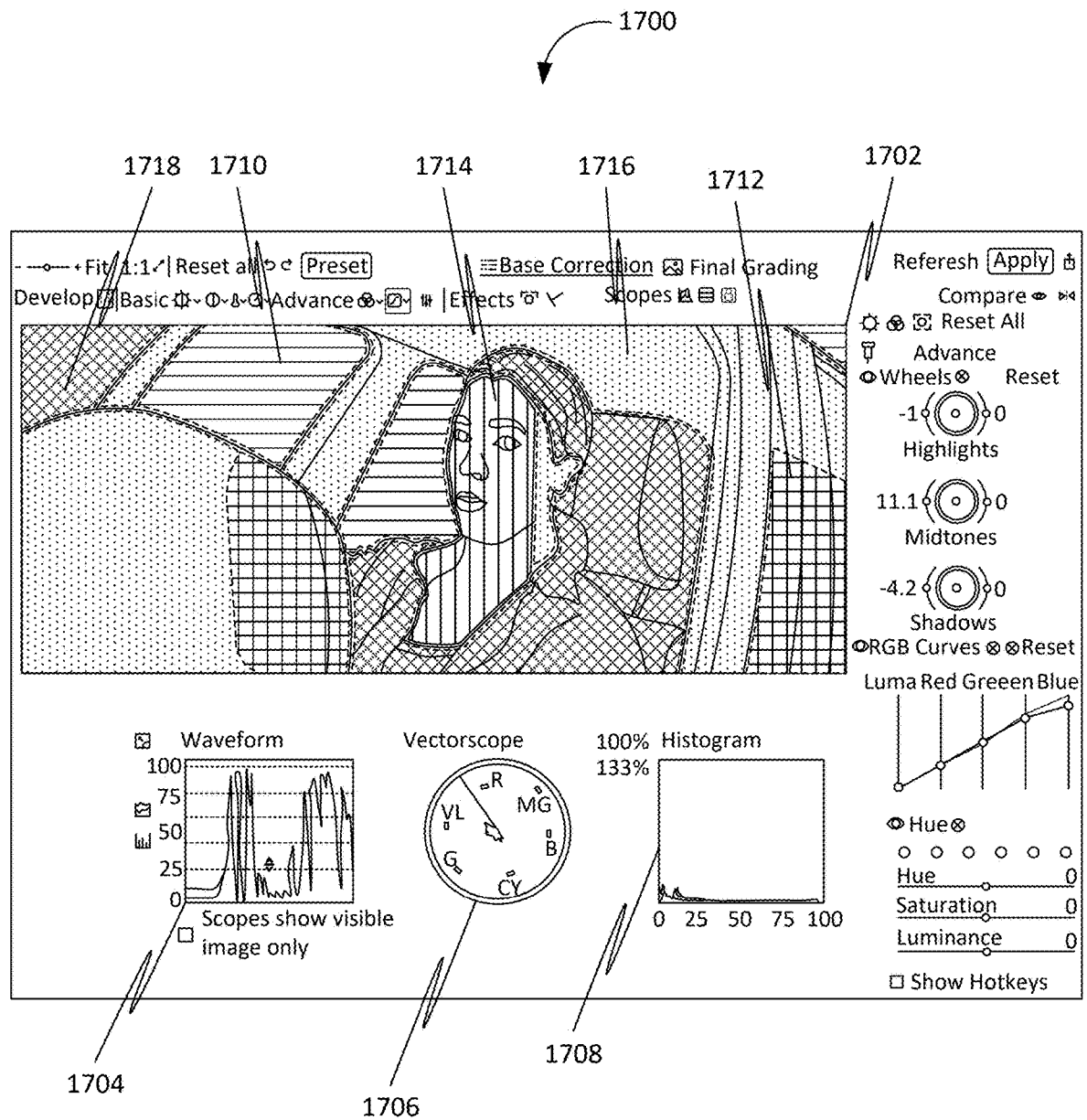
FIG. 17 illustrates a user interface 1700 for facilitating editing of images using image editing tools, in accordance with some embodiments.

FIG. 17 illustrates a user interface 1700 for facilitating editing of images using image editing tools, in accordance with some embodiments. Further, the user interface 1700 may include the at least one image 1702. Further, the at least one image 1702 may include a plurality of areas 1710-1718. Further, the plurality of areas 1710-1718 may include a first area 1710 associated with highlights, a second area 1712 associated with undertones, a third area 1714 associated with midtones, a fourth area 1716 associated with overtones, and a fifth area 1718 associated with shadows. Further, the user interface 1700 may include one or more adjustment tools. Further, the one or more adjustment tools may include a waveform scope 1704, a vector scope 1706, and a histogram scope 1708. Further, the waveform scope 1704 may include a waveform display area comprising a plurality of regions. Further, the plurality of regions corresponds to a respective one of the plurality of tonal ranges. Further, the receiving of the selection of a region of the plurality of regions may be based on placing an indicator on the region. Further, the receiving of the directional input may be based on a clicking on the first location based on the placing, and linearly moving the indicator to the second location.

Figure 18:
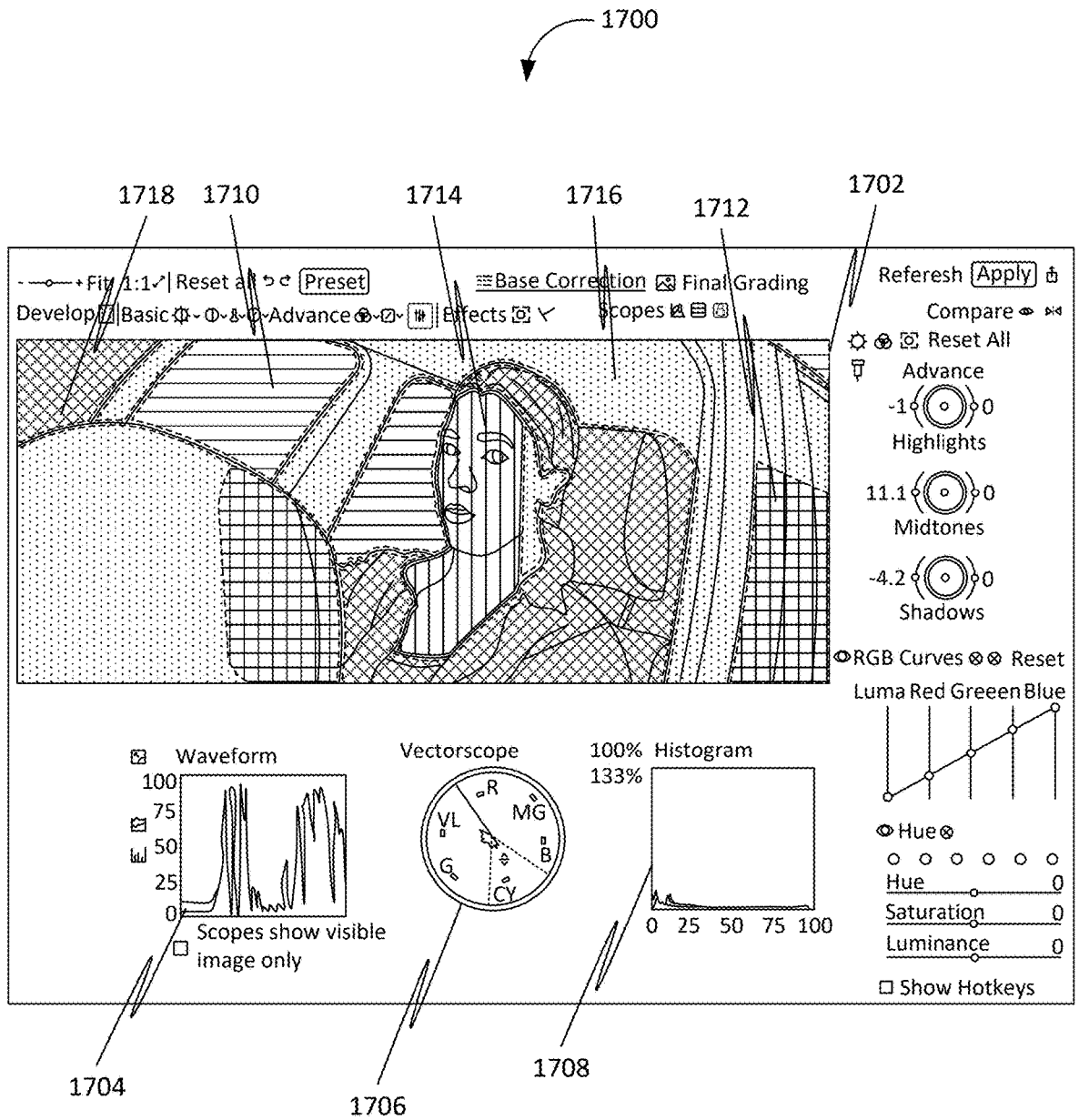
FIG. 18 illustrates the user interface 1700 for facilitating editing of images using image editing tools, in accordance with some embodiments.

FIG. 18 illustrates the user interface 1700 for facilitating editing of images using image editing tools, in accordance with some embodiments. Further, the vector scope 1706 may include a vectorscope display area. Further, the receiving of the selection of a graphical representation portion of the plurality of graphical representation portions may be based on placing an indicator on the graphical representation portion. Further, the receiving of the directional input may be based on clicking on the first location based on the placing, and vectorially moving the indicator to the second location.

Figure 19:
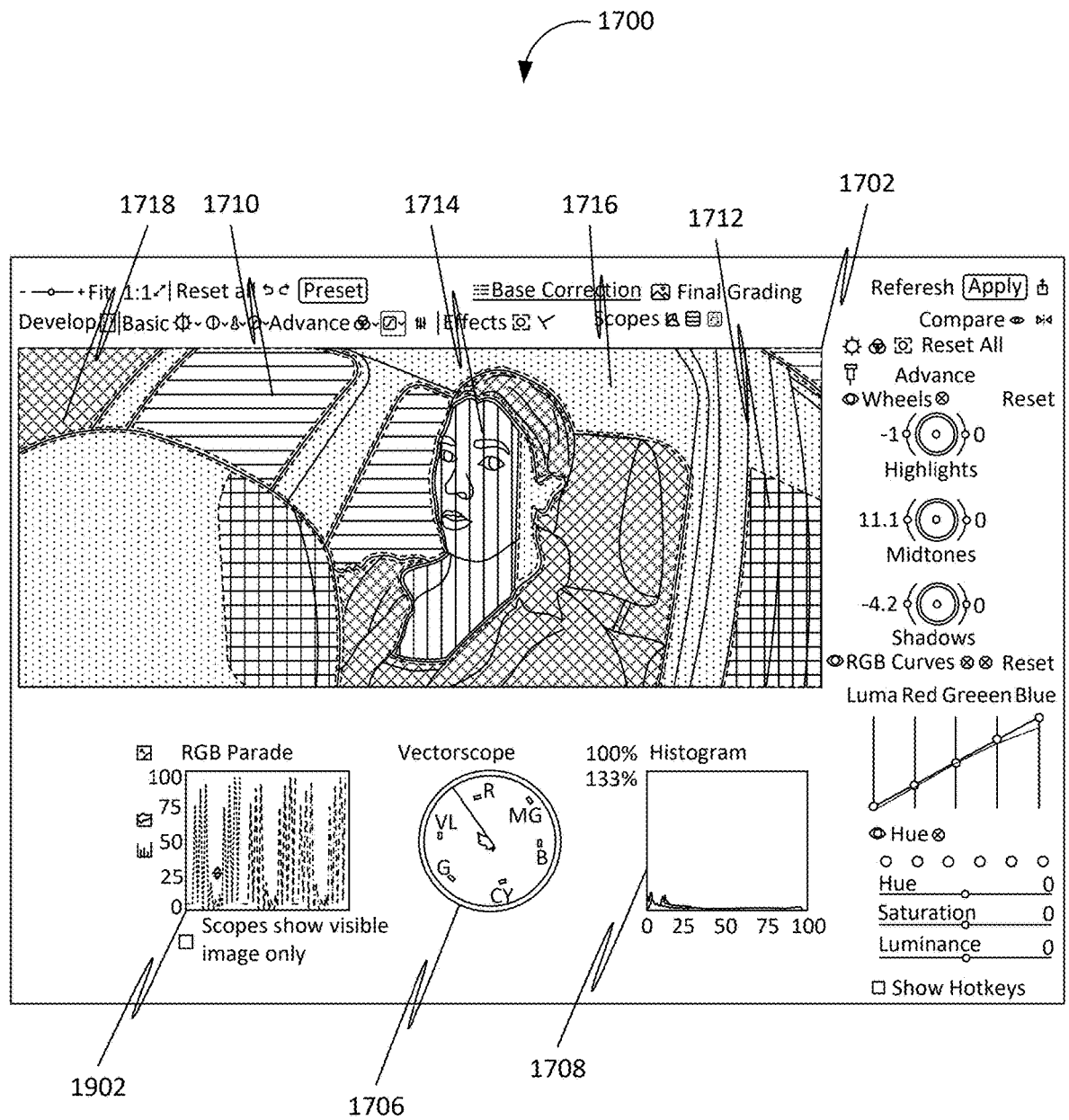
FIG. 19 illustrates the user interface 1700 for facilitating editing of images using image editing tools, in accordance with some embodiments.

FIG. 19 illustrates the user interface 1700 for facilitating editing of images using image editing tools, in accordance with some embodiments. Further, the one or more adjustment tools may include a parade waveform scope (i.e., RGB parade) 1902. Further, the parade waveform scope 1902 may include the waveform display area.

Figure 20:
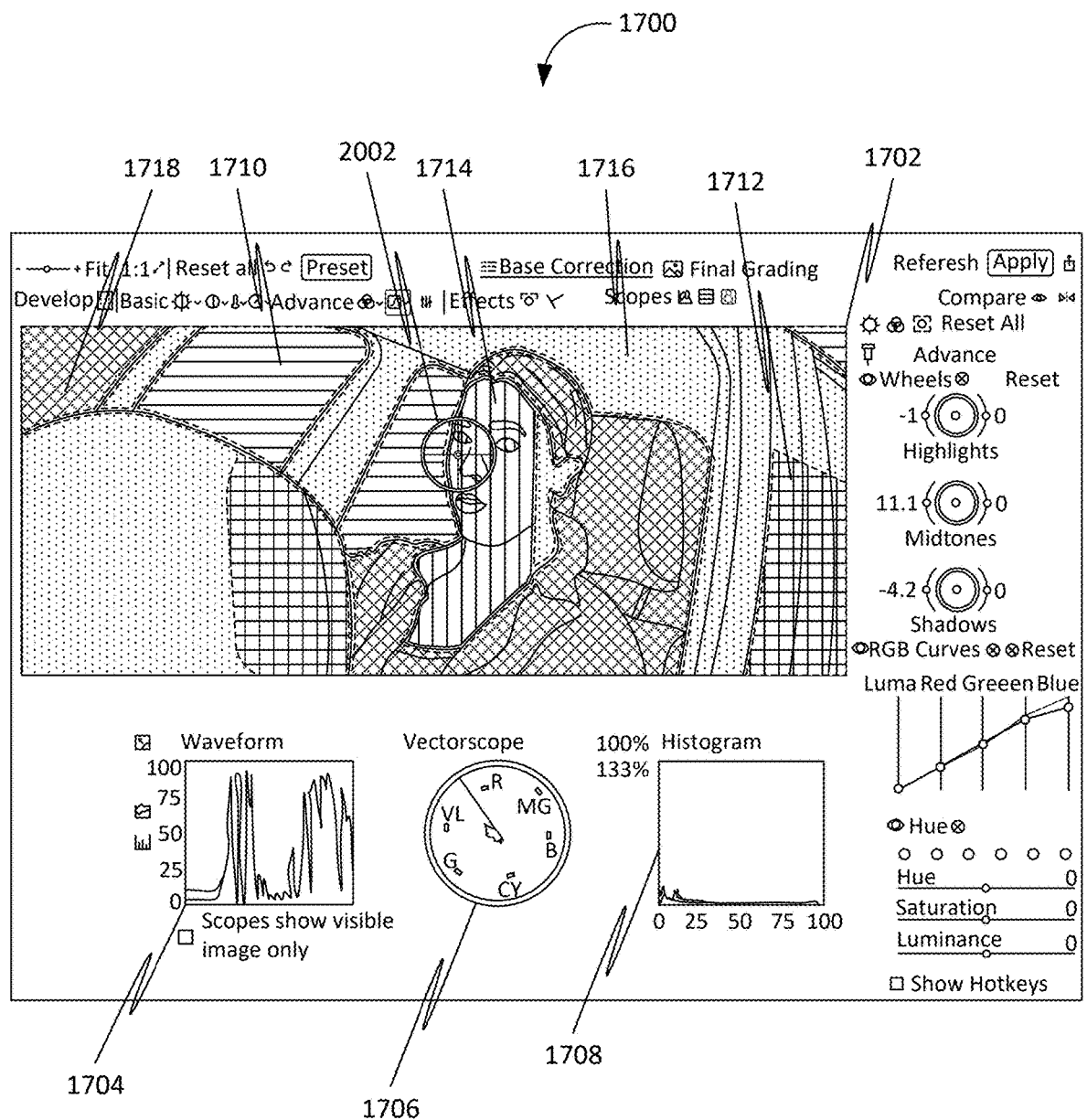
FIG. 20 illustrates the user interface 1700 for facilitating editing of images using image editing tools, in accordance with some embodiments.

FIG. 20 illustrates the user interface 1700 for facilitating editing of images using image editing tools, in accordance with some embodiments. Further, the user interface 1700 displays a color wheel 2002 on the at least one image 1702. Further, the plurality of adjustment tools comprises the color wheel 2002. Further, the color wheel 2002 may be displayed on the at least one image 1702 and proximal to a location for which the selection is received.

Although the invention has been explained in relation to its preferred embodiment, it is to be understood that many other possible modifications and variations can be made without departing from the spirit and scope of the invention as hereinafter claimed.

What is claimed is:

1. A non-transitory computer-readable medium storing one or more instructions which, when executed by a processing device of a computing device, causes the computing device to perform a method for facilitating editing of images using image editing tools, the method comprising:
displaying at least one image;
obtaining at least one information of the at least one image;
analyzing the at least one information;
identifying a plurality of areas of the at least one image based on the analyzing of the at least one information;
determining a tonal range from a plurality of tonal ranges for each of the plurality of areas based on the analyzing of the at least one information, and the identifying of the plurality of areas;
determining a value for at least one attribute associated with each of a plurality of image elements of the at least one image based on the analyzing of the at least one information, wherein the at least one image is comprised of the plurality of image elements;
generating at least one graphical representation of the at least one image based on the value for each of the at least one attribute associated with each of the plurality of image elements of the at least one image;
displaying at least one adjustment tool, wherein at least one of the at least one adjustment tool comprises at least one display area, wherein the at least one graphical representation is displayed in the at least one display area;
obtaining a selection of a setting from a plurality of settings associated with the at least one adjustment tool, wherein the obtaining of the selection of the setting is further based on either one of an image interaction with the at least one image and an adjustment tool interaction with the at least one adjustment tool;
performing at least one operation on the at least one image based on the selection of the setting, wherein the at least one operation comprises an adjustment made in relation to at least one of the plurality of tonal ranges;
generating at least one edited image based on the performing of the at least one operation; and
displaying the at least one edited image.

2. The non-transitory machine-readable medium of claim 1, wherein the at least one graphical representation comprises a waveform representation, wherein the waveform representation represents a distribution of at least one of a luminance value and a chrominance value of one or more image elements present at each of a plurality of horizontal locations of the at least one image, wherein each of a plurality of horizontal positions within the waveform representation corresponds to a respective one of the plurality of horizontal locations of the at least one image, wherein each of a plurality of vertical positions within the waveform representation corresponds to a magnitude associated with at least one of the luminance value and the chrominance value, wherein the at least one adjustment tool comprises a waveform scope, wherein the at least one display area comprises a waveform display area, wherein the waveform representation is displayed in the waveform display area.

3. The non-transitory machine-readable medium of claim 1, wherein the at least one graphical representation comprises a plurality of waveform representations, wherein each of the plurality of waveform representations represents a distribution of a color component value of one or more image elements present at each of a plurality of horizontal locations of the at least one image, wherein the color component value corresponds to a color channel of a plurality of color channels, wherein the plurality of waveform representations are spatially segregated, wherein each of a plurality of horizontal positions within each of the plurality of waveform representations corresponds to a respective one of the plurality of horizontal locations of the at least one image, wherein each of a plurality of vertical positions within each of the plurality of waveform representations corresponds to a respective magnitude associated with a corresponding one of the plurality of color component values, wherein the at least one adjustment tool comprises a parade waveform scope, wherein the at least one display area comprises a waveform display area, wherein the plurality of waveform representations are displayed in the waveform display area.

4. The non-transitory machine-readable medium of claim 1, wherein the at least one graphical representation comprises a vectorscope representation, wherein the vectorscope representation represents a distribution of a chrominance value of the plurality of image elements in the at least one image, wherein each of a plurality of angular positions within the vectorscope representation corresponds to a respective hue value associated with one or more image elements of the at least one image, wherein each of a plurality of radial positions within the vectorscope representation corresponds to a respective saturation value associated with the one or more image elements, wherein the chrominance value comprises a hue value and a saturation value, wherein the at least one adjustment tool comprises a vector scope, wherein the at least one display area comprises a vectorscope display area, wherein the vectorscope representation is displayed in the vectorscope display area.

5. The non-transitory machine-readable medium of claim 1, wherein the at least one graphical representation comprises a plurality of histogram representations, wherein each of the plurality of histogram representations represents a distribution of a color value for the plurality of image elements across the at least one image, wherein the color value corresponds to a color channel of a plurality of color channels, wherein the at least one adjustment tool comprises a histogram scope, wherein the at least one display area comprises a histogram display area, wherein the plurality of histogram representations is displayed in the histogram display area.

6. The non-transitory machine-readable medium of claim 1, wherein the at least one graphical representation is associated with a plurality of regions of the at least one display area, wherein each one of the plurality of regions corresponds to a respective one of the plurality of tonal ranges, wherein the method further comprises:
    receiving a selection of a region of the plurality of regions, and a directional input from a first location to a second location of the at least one display area; and
    analyzing the selection of the region, and the directional input, wherein the obtaining of the setting of the plurality of settings is further based on the analyzing of the selection of the region, and the directional input.

7. The non-transitory machine-readable medium of claim 1, wherein the at least one graphical representation comprises a plurality of graphical representation portions, wherein each of the plurality of graphical representation portions corresponds to a respective one of the plurality of tonal ranges, wherein the method further comprises:
    receiving a selection of a graphical representation portion of the plurality of graphical representation portions of the at least one graphical representation comprised in the at least one adjustment tool, and a directional input from a first location to a second location of the at least one display area; and
    analyzing the selection of the graphical representation portion, and the directional input, wherein the obtaining of the setting of the plurality of settings is further based on the analyzing of the selection of the graphical representation portion, and the directional input.

8. The non-transitory machine-readable medium of claim 1, wherein the method further comprises:
    modifying the at least one graphical representation based on the performing of the at least one operation; and
    generating at least one modified graphical representation based on the modifying of the at least one graphical representation, wherein the at least one modified graphical representation is displayed in the at least one display area.

9. The non-transitory machine-readable medium of claim 1, wherein the analyzing of the at least one information comprises analyzing the at least one information using at least one machine learning model, wherein the method further comprises:
    generating a depth map for the at least one image based on the analyzing of the at least one information using the at least one machine learning model;
    displaying the depth map;
    receiving a selection of a location on the at least one image; and
    identifying an area associated with the location based on the selection and the depth map, wherein the displaying of the at least one adjustment tool comprises displaying the at least one adjustment tool on the at least one image based on the identifying of the area, wherein the at least one adjustment tool is proximal to the location, wherein the performing of the at least one operation on the at least one image comprises performing the at least one operation on the area of the at least one image, wherein the generating of the at least one edited image is further based on the performing of the at least one operation on the area of the at least one image.

10. A method for facilitating editing of images using image editing tools, the method comprising:
    displaying, using a display device of a computing device, at least one image;
    obtaining, using a processing device of the computing device, at least one information of the at least one image;
    analyzing, using the processing device of the computing device, the at least one information;
    identifying, using the processing device of the computing device, a plurality of areas of the at least one image based on the analyzing of the at least one information;
    determining, using the processing device of the computing device, a tonal range from a plurality of tonal ranges for each of the plurality of areas based on the analyzing of the at least one information, and the identifying of the plurality of areas;
    determining, using the processing device of the computing device, a value for at least one attribute associated with each of a plurality of image elements of the at least one image based on the analyzing of the at least one information, wherein the at least one image is comprised of the plurality of image elements;
    generating, using the processing device of the computing device, at least one graphical representation of the at least one image based on the value for each of the at least one attribute associated with each of the plurality of image elements of the at least one image;
    displaying, using the display device of the computing device, at least one adjustment tool, wherein at least one of the at least one adjustment tool comprises at least one display area, wherein the at least one graphical representation is displayed in the at least one display area;
    obtaining, using the processing device of the computing device, a selection of a setting from a plurality of settings associated with the at least one adjustment tool, wherein the obtaining of the selection of the setting is further based on either one of an image interaction with the at least one image and an adjustment tool interaction with the at least one adjustment tool;
    performing, using the processing device of the computing device, at least one operation on the at least one image based on the selection of the setting, wherein the at least one operation comprises an adjustment made in relation to at least one of the plurality of tonal ranges;
    generating, using the processing device of the computing device, at least one edited image based on the performing of the at least one operation; and
    displaying, using the display device of the computing device, the at least one edited image.

11. The method of claim 10, wherein the at least one graphical representation comprises a waveform representation, wherein the waveform representation represents a distribution of at least one of a luminance value and a chrominance value of one or more image elements present at each of a plurality of horizontal locations of the at least one image, wherein each of a plurality of horizontal positions within the waveform representation corresponds to a respective one of the plurality of horizontal locations of the at least one image, wherein each of a plurality of vertical positions within the waveform representation corresponds to a magnitude associated with at least one of the luminance value and the chrominance value, wherein the at least one adjustment tool comprises a waveform scope, wherein the at least one display area comprises a waveform display area, wherein the waveform representation is displayed in the waveform display area.

12. The method of claim 10, wherein the at least one graphical representation comprises a plurality of waveform representations, wherein each of the plurality of waveform representations represents a distribution of a color component value of one or more image elements present at each of a plurality of horizontal locations of the at least one image, wherein the color component value corresponds to a color channel of a plurality of color channels, wherein the plurality of waveform representations are spatially segregated, wherein each of a plurality of horizontal positions within each of the plurality of waveform representations corresponds to a respective one of the plurality of horizontal locations of the at least one image, wherein each of a plurality of vertical positions within each of the plurality of waveform representations corresponds to a respective magnitude associated with a corresponding one of the plurality of color component values, wherein the at least one adjustment tool comprises a parade waveform scope, wherein the at least one display area comprises a waveform display area, wherein the plurality of waveform representations are displayed in the waveform display area.

13. The method of claim 10, wherein the at least one graphical representation comprises a vectorscope representation, wherein the vectorscope representation represents a distribution of a chrominance value of the plurality of image elements in the at least one image, wherein each of a plurality of angular positions within the vectorscope representation corresponds to a respective hue value associated with one or more image elements of the at least one image, wherein each of a plurality of radial positions within the vectorscope representation corresponds to a respective saturation value associated with the one or more image elements, wherein the chrominance value comprises a hue value and a saturation value, wherein the at least one adjustment tool comprises a vector scope, wherein the at least one display area comprises a vectorscope display area, wherein the vectorscope representation is displayed in the vectorscope display area.

14. The method of claim 10, wherein the at least one graphical representation comprises a plurality of histogram representations, wherein each of the plurality of histogram representations represents a distribution of a color value for the plurality of image elements across the at least one image, wherein the color value corresponds to a color channel of a plurality of color channels, wherein the at least one adjustment tool comprises a histogram scope, wherein the at least one display area comprises a histogram display area, wherein the plurality of histogram representations is displayed in the histogram display area.

15. The method of claim 10, wherein the at least one graphical representation is associated with a plurality of regions of the at least one display area, wherein each one of the plurality of regions corresponds to a respective one of the plurality of tonal ranges, wherein the method further comprises:
receiving, using an input device of the computing device, a selection of a region of the plurality of regions, and a directional input from a first location to a second location of the at least one display area; and
analyzing, using the processing device of the computing device, the selection of the region, and the directional input, wherein the obtaining of the setting of the plurality of settings is further based on the analyzing of the selection of the region, and the directional input.

16. The method of claim 10, wherein the at least one graphical representation comprises a plurality of graphical representation portions, wherein each of the plurality of graphical representation portions corresponds to a respective one of the plurality of tonal ranges, wherein the method further comprises:
receiving, using an input device of the computing device, a selection of a graphical representation portion of the plurality of graphical representation portions of the at least one graphical representation comprised in the at least one adjustment tool, and a directional input from a first location to a second location of the at least one display area; and
analyzing, using the processing device of the computing device, the selection of the graphical representation portion, and the directional input, wherein the obtaining of the setting of the plurality of settings is further based on the analyzing of the selection of the graphical representation portion, and the directional input.

17. The method of claim 10 further comprising:
modifying, using the processing device of the computing device, the at least one graphical representation based on the performing of the at least one operation; and
generating, using the processing device of the computing device, at least one modified graphical representation based on the modifying of the at least one graphical representation, wherein the at least one modified graphical representation is displayed in the at least one display area.

18. The method of claim 10, wherein the analyzing of the at least one information comprises analyzing the at least one information using at least one machine learning model, wherein the method further comprises:
generating, using the processing device of the computing device, a depth map for the at least one image based on the analyzing of the at least one information using the at least one machine learning model;
displaying, using the display device of the computing device, the depth map;
receiving, using an input device of the computing device, a selection of a location on the at least one image; and
identifying, using the processing device of the computing device, an area associated with the location based on the selection and the depth map, wherein the displaying of the at least one adjustment tool comprises displaying the at least one adjustment tool on the at least one image based on the identifying of the area, wherein the at least one adjustment tool is proximal to the location, wherein the performing of the at least one operation on the at least one image comprises performing the at least one operation on the area of the at least one image, wherein the generating of the at least one edited image is further based on the performing of the at least one operation on the area of the at least one image.

19. A system for facilitating editing of images using image editing tools, the system comprising:
a display device configured for:
displaying at least one image;
displaying at least one adjustment tool, wherein at least one of the at least one adjustment tool comprises at least one display area, wherein at least one graphical representation is displayed in the at least one display area; and
displaying at least one edited image; and
a processing device communicatively coupled with the display device, wherein the processing device is configured for:
obtaining at least one information of the at least one image;
analyzing the at least one information;

identifying a plurality of areas of the at least one image based on the analyzing of the at least one information;

determining a tonal range from a plurality of tonal ranges for each of the plurality of areas based on the analyzing of the at least one information, and the identifying of the plurality of areas;

determining a value for at least one attribute associated with each of a plurality of image elements of the at least one image based on the analyzing of the at least one information, wherein the at least one image is comprised of the plurality of image elements;

generating the at least one graphical representation of the at least one image based on the value for each of the at least one attribute associated with each of the plurality of image elements of the at least one image;

obtaining a selection of a setting from a plurality of settings associated with the at least one adjustment tool, wherein the obtaining of the selection of the setting is further based on either one of an image interaction with the at least one image and an adjustment tool interaction with the at least one adjustment tool;

performing at least one operation on the at least one image based on the selection of the setting, wherein the at least one operation comprises an adjustment made in relation to at least one of the plurality of tonal ranges; and generating the at least one edited image based on the performing of the at least one operation.

20. The system of claim 19, wherein the analyzing of the at least one information comprises analyzing the at least one information using at least one machine learning model, wherein the processing device is further configured for:

generating a depth map for the at least one image based on the analyzing of the at least one information using the at least one machine learning model; and identifying an area associated with a location based on a selection and the depth map, wherein the displaying of the at least one adjustment tool comprises displaying the at least one adjustment tool on the at least one image based on the identifying of the area, wherein the at least one adjustment tool is proximal to the location, wherein the performing of the at least one operation on the at least one image comprises performing the at least one operation on the area of the at least one image, wherein the generating of the at least one edited image is further based on the performing of the at least one operation on the area of the at least one image, wherein the display device is further configured for displaying the depth map, wherein the system further comprises an input device communicatively coupled with the processing device, wherein the input device is configured for receiving the selection of the location on the at least one image.

* * * * *